(12) United States Patent
Madabhushi et al.

(10) Patent No.: US 9,002,092 B2
(45) Date of Patent: Apr. 7, 2015

(54) IMAGE-BASED RISK SCORE—A PROGNOSTIC PREDICTOR OF SURVIVAL AND OUTCOME FROM DIGITAL HISTOPATHOLOGY

(75) Inventors: Anant Madabhushi, South Plainfield, NJ (US); Ajay Basavanhally, Skillman, NJ (US); Shridar Ganesan, Westfield, NJ (US)

(73) Assignee: Rutgers, The State University Of New Jersey, New Brunswick, NJ (US)

( * ) Notice: Subject to any disclaimer, the term of this patent is extended or adjusted under 35 U.S.C. 154(b) by 909 days.

(21) Appl. No.: 13/147,537

(22) PCT Filed: Feb. 2, 2010

(86) PCT No.: PCT/US2010/022891
§ 371 (c)(1),
(2), (4) Date: Jan. 12, 2012

(87) PCT Pub. No.: WO2010/088672
PCT Pub. Date: Aug. 5, 2010

(65) Prior Publication Data
US 2012/0106821 A1 May 3, 2012

Related U.S. Application Data

(60) Provisional application No. 61/149,158, filed on Feb. 2, 2009.

(51) Int. Cl.
*G06K 9/00* (2006.01)
*G06T 7/00* (2006.01)

(52) U.S. Cl.
CPC .......... *G06T 7/0012* (2013.01); *G06K 9/00147* (2013.01); *G06T 2207/30024* (2013.01); *G06T 2207/30096* (2013.01)

(58) Field of Classification Search
CPC .................. G06T 7/0012; G06T 2207/30096; G06T 2207/30024; G06T 2207/10056; G06K 9/00147
See application file for complete search history.

(56) References Cited

U.S. PATENT DOCUMENTS

2002/0150285 A1 10/2002 Nelson
2004/0122790 A1 6/2004 Walker et al.
(Continued)

FOREIGN PATENT DOCUMENTS

CN 1623163 A 6/2005
CN 1653332 A 8/2005

OTHER PUBLICATIONS

Doyle et al., "Automated Grading of Breast Cancer Histopathology using Spectral Clustering with Textural and Architectural Image Features", May 17, 2008, IEEE Int. Symposium on Biomedical Imaging, p. 496-499.*
(Continued)

*Primary Examiner* — Stephen R Koziol
*Assistant Examiner* — Timothy Choi
(74) *Attorney, Agent, or Firm* — Davidson, Davidson & Kappel, LLC

(57) ABSTRACT

The present invention relates to an image-based computer-aided prognosis (CAP) system and method that seeks to replicate the prognostic power of molecular assays in histopathology and pathological processes, including but not limited to cancer. Using only a tissue slide samples, a mechanism for digital slide scanning, and a computer, the present invention relates to an image-based CAP system and method which aims to overcome many of the drawbacks associated with prognostic molecular assays (e.g. Oncotype DX) including the high cost associated with the assay, limited laboratory facilities with specialized equipment, and length of time between biopsy and prognostic prediction.

5 Claims, 8 Drawing Sheets

(a), (d) Low and high grade LN-, ER+ BC samples are shown with (b), (e) Delaunay Triangulation and (c), (f) Minimum Spanning Tree graphs overlaid.

(56) References Cited

U.S. PATENT DOCUMENTS

2006/0098871 A1 5/2006 Szummer
2013/0004053 A1 1/2013 Hunter et al.

OTHER PUBLICATIONS

Kong et al., "Image Analysis for Automated Assessment of Grade of Neuroblastic Differentiation", Apr. 15, 2007, IEEE Int. Symposium on Biomedical Imaging, p. 61-64.*

Brand, "Charting a Manifold", 2003, MIT Press, Advances in Neural Information Processing Systems 15, p. 961-968.*

Bilgin et al., "Cell-Graph Mining for Breast Tissue Modeling and Classification", Aug. 26, 2007, Proceedings of the 29th Annual Int. Conf. of the IEEE EMBS, p. 5311-5314.*

Written Opinion of the International Search Authority issued by the International Bureau of WIPO in connection with corresponding International Application No. PCT/US2010/022891 dated Sep. 1, 2011.

International Search Report and Written Opinion issued by the International Bureau of WIPO in connection with corresponding International Application No. PCT/US2010/022891 dated Aug. 11, 2011.

International Search report in connection with Chinese Application No. 201080012959.7 dated Feb. 2, 2014.

* cited by examiner

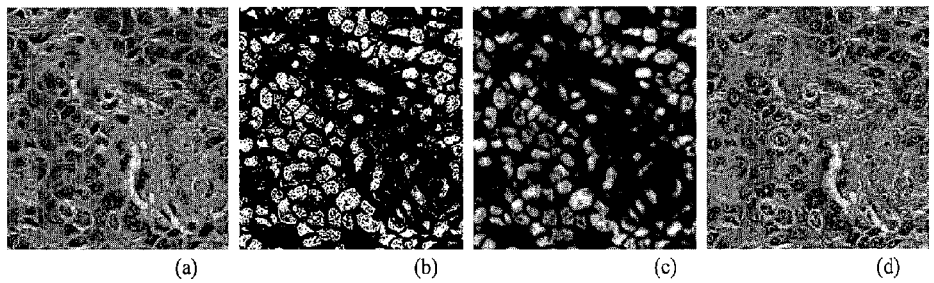

Fig. 1. A (a) LN-, ER+ BC histopathology image shown along with its corresponding (b) EM-based segmentation of BC nuclei. The segmentation in (b) is (c) smoothed to help detect individual nuclei and the (d) final detected nuclear centroids (black dots) are used for feature extraction.

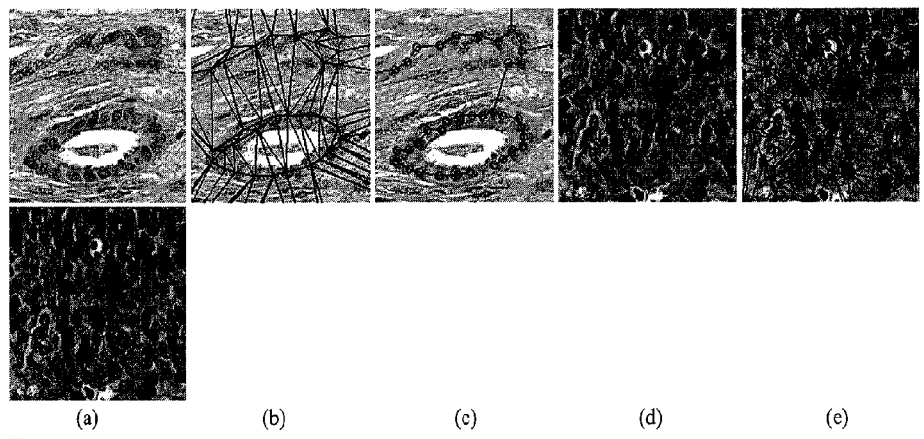

Fig. 2. (a), (d) Low and high grade LN-, ER+ BC samples are shown with (b), (e) Delaunay Triangulation and (c), (f) Minimum Spanning Tree graphs overlaid.

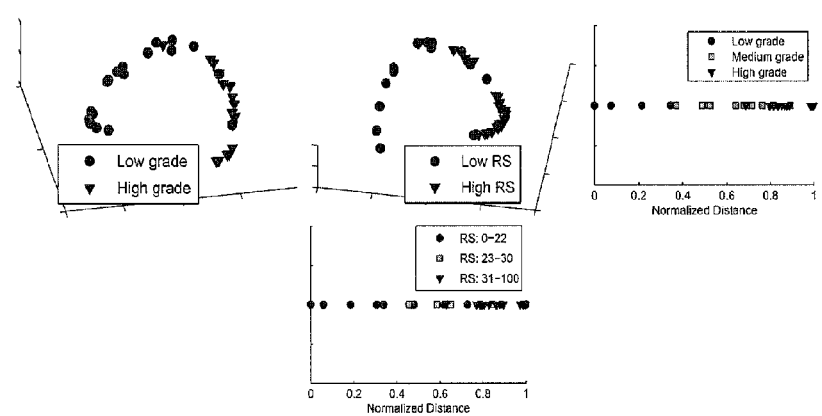

(a) (b) (c)
(d)

Fig. 3. Graph Embedding plots of architectural features show clear separation of different (a) BC grades and (b) RS labels. The embeddings are projected into a 1D line, where (c) BC grade and (d) RS are defined by a single score.

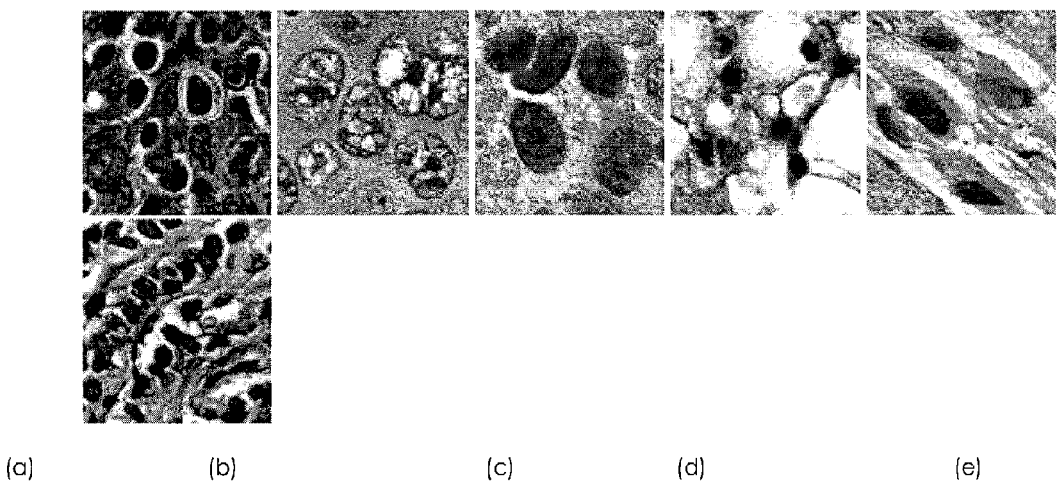

(a) (b) (c) (d) (e)
(f)

Fig. 4. There are several challenges in automated lymphocyte detection including (a) the similarity in appearance between a cancer cell nucleus and a lymphocyte nucleus. In general, lymphocyte nuclei are distinguished from cancer cell nuclei by their smaller size, more circular shape, and a darker, homogeneous staining. Additional challenges include variations in the appearance of (b), (c) BC nuclei within a single histopathology slide, (d) the presence of fat among cancerous tissue, (e) histological fixing, and (f) slide digitization artifacts.

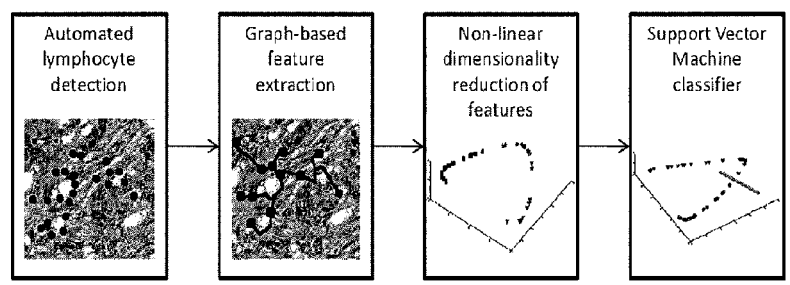

Fig. 5. A flowchart illustrating the 4 main steps in the CADx system and method for LI-based stratification of HER2+ BC histopathology. Automated lymphocyte detection is followed by feature extraction of architectural and morphological features. The high-dimensional feature space is then non-linearly embedded into a reduced dimensional space via Graph Embedding, which allows for data visualization and subsequent evaluation via a SVM classifier.

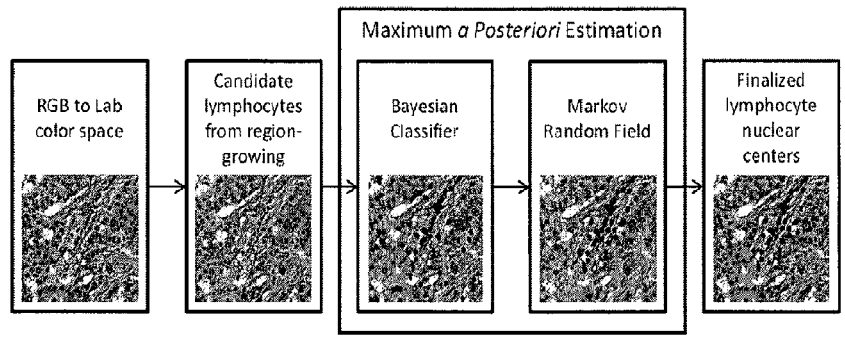

Fig. 6. A flowchart illustrating the main steps in the automated lymphocyte detection system and method.

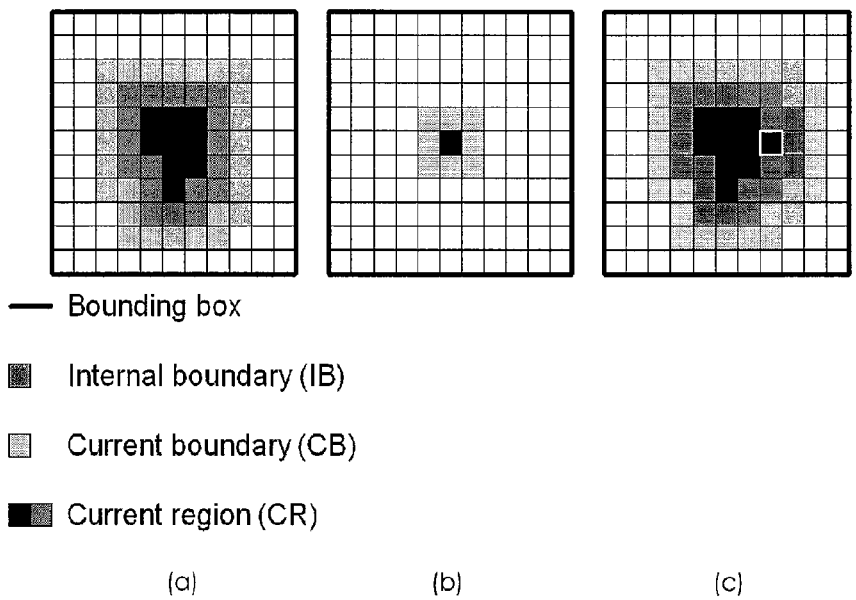

Fig. 7. Schematic illustrating the iterative growth of a region $r$. After initialization of the current region $S_{CR}$ (Figure 7(a)), current boundary $S_{CB}$, and bounding box $S_{BB}$, new pixels are added iteratively (Figure 7(b)). When a new pixel (outlined in white) is added to $S_{CR}$, the boundaries $S_{CB}$ and $S_{IB}$ are adjusted accordingly (Figure 7(c)).

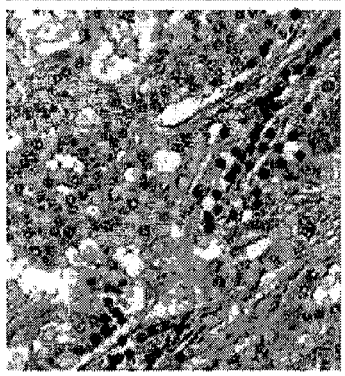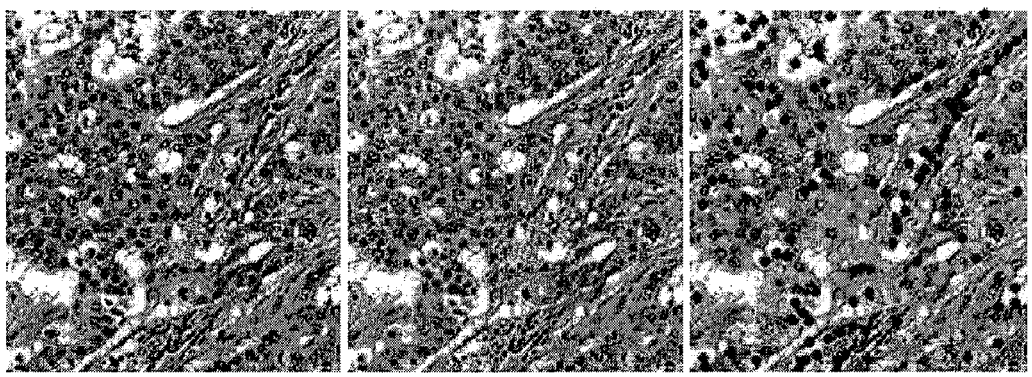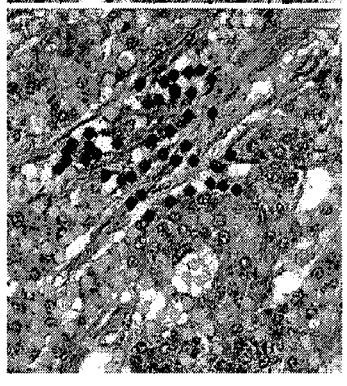
(a) (b) (c)
(d)
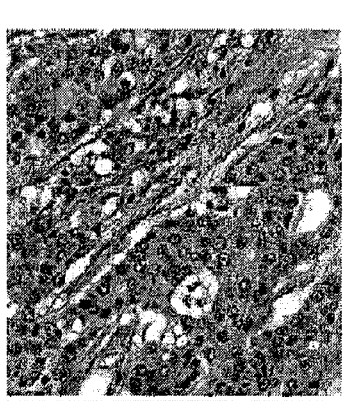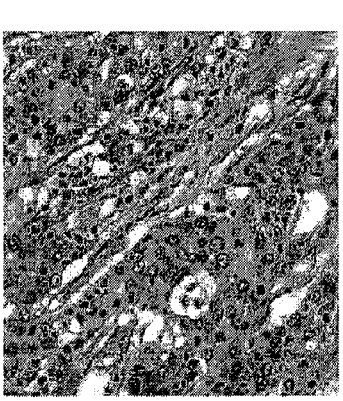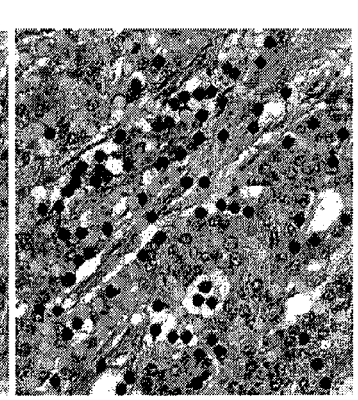
(e) (f) (g)
(h)

Fig. 8. (a), (e) Luminance channels of two different HER2+ BC histopathology studies and corresponding results for (b), (f) initial region-growing based lymphocyte detection, (c), (g) preliminary Bayesian refinement showing detected BC nuclei (light circles) and detected lymphocyte nuclei (dark circles), and (d), (h) final lymphocyte detection result after the MRF pruning step.

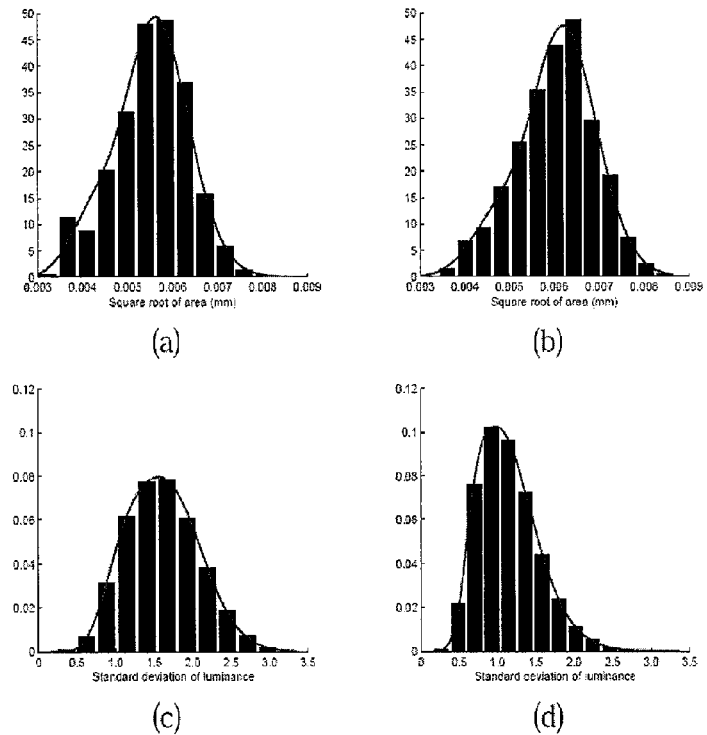

Fig. 9. Probability density functions (PDFs) estimated from empirical training data and modeled via weighted sum of gamma distributions for (a), (c) $\omega_\ell$ and (b), (d) $\omega_b$ classes for (a), (b) square root of area and (c), (d) variance in luminance of each $r \in R$. In each distribution (a)-(d), the estimated parametric model is overlaid.

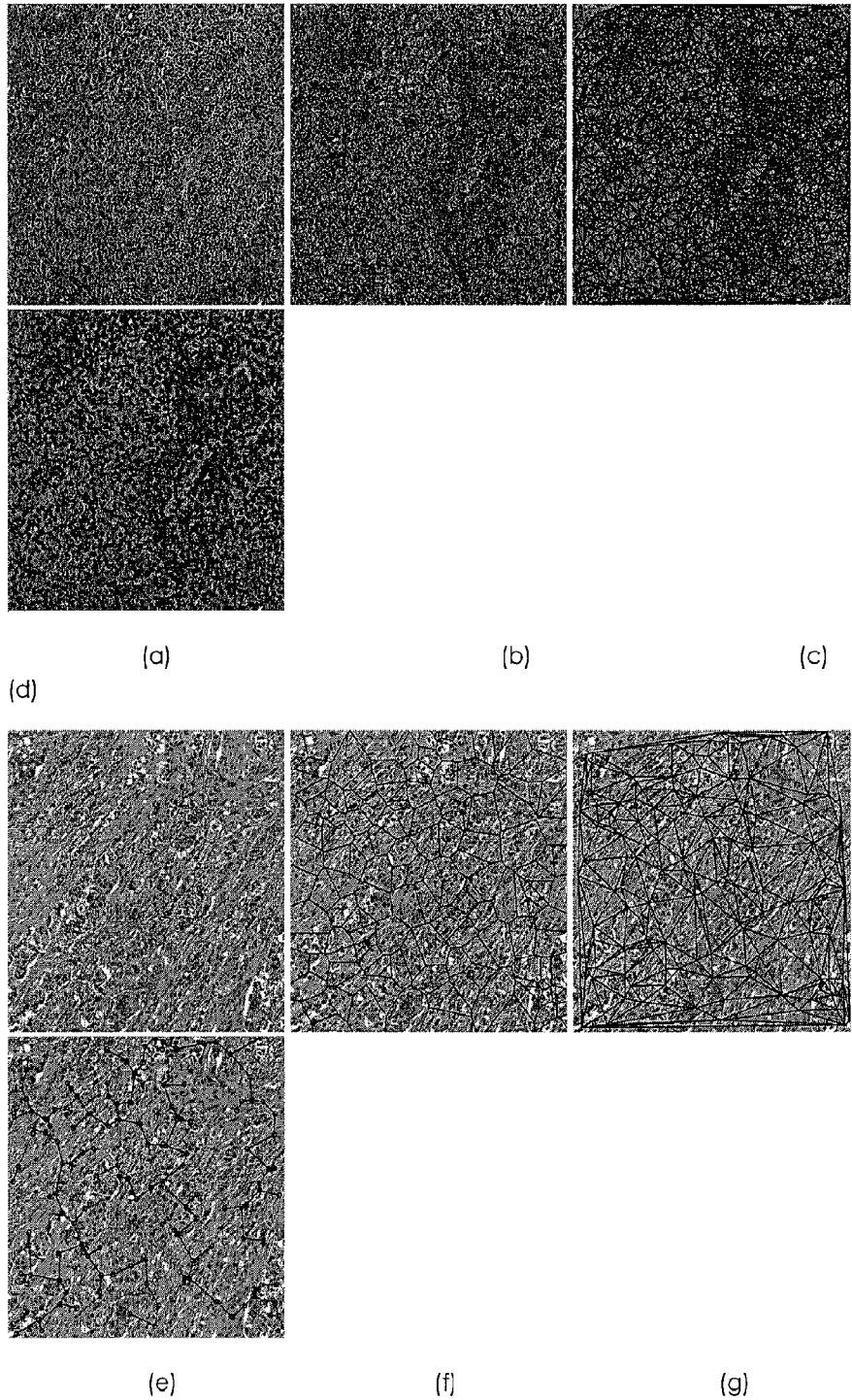
Fig. 10. Two different HER2+ breast cancer histopathology images with (a) high and (b) low levels of LI. Figures 10((b), (f)) show the corresponding Voronoi Diagrams constructed using the automatically detected lymphocyte centers as vertices of the graph. Corresponding Delaunay Triangulation and Minimum Spanning Tree graphs are shown in Figures 10((c), (g)) and 10((d), (h)), respectively.

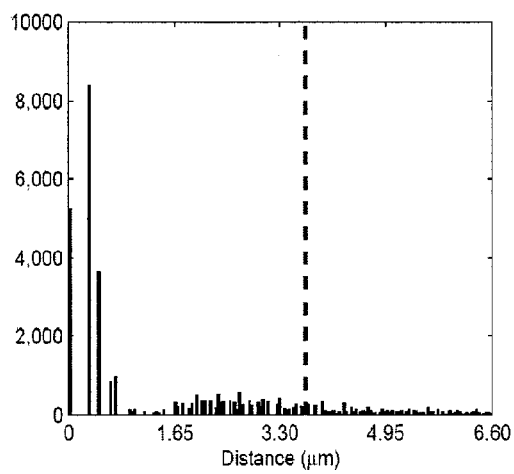

Fig. 11. A histogram of the partial, directed Hausdorff distances $\Phi_H(\mathcal{O}^{auto}, \mathcal{O}^{man})$ between automatically and manually detected lymphocyte nuclei in all 41 BC histopathology images. The dashed line denotes the median of the errors of the automated lymphocyte detection system and method.

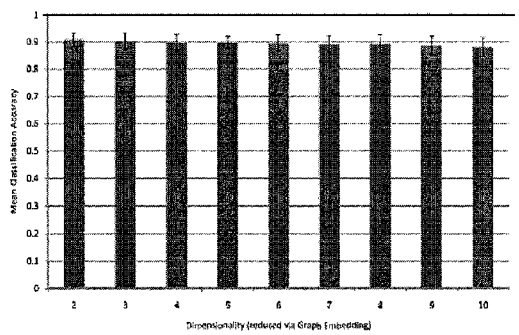

Fig. 12. The mean ($\mu_{ACC}$) classification accuracy over 100 trials of 3-fold cross-validation is shown for different dimensionalities $\{2, 3, \ldots, 10\}$ obtained via Graph Embedding. The error bars represent standard deviation ($\sigma_{ACC}$) of the classification accuracy.

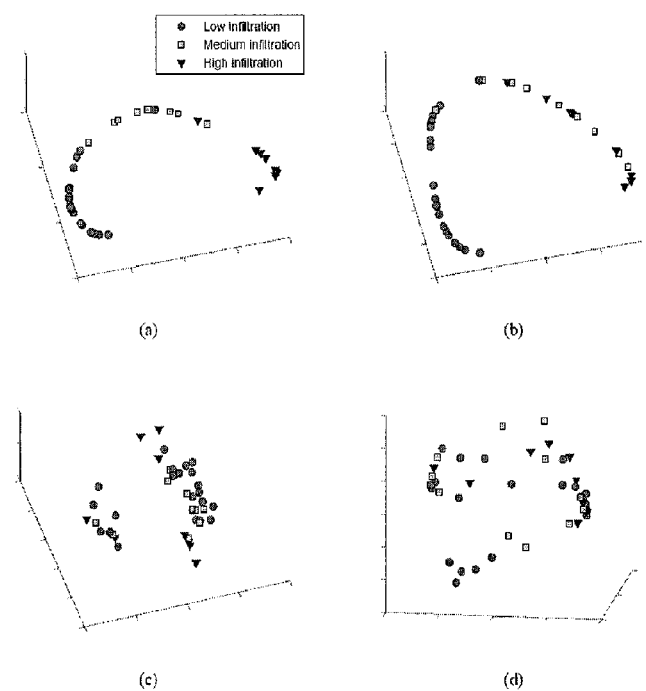

Fig. 13. All 41 images plotted in the Graph Embedding reduced 3-dimensional Eigen space for the architectural feature set derived from (a) manual and (b) automated lymphocyte detection. Embeddings of the Varma-Zisserman features are shown for (c) $K = 3$ and (d) $K = 5$. The labels denote samples with low LI (circles), medium LI, (squares), and high LI (triangles) as determined by an expert oncologist. Note that GE with the architectural features reveals the presence of an underlying manifold structure showing a smooth continuum of BC samples with low, medium, and high levels of LI.

IMAGE-BASED RISK SCORE—A PROGNOSTIC PREDICTOR OF SURVIVAL AND OUTCOME FROM DIGITAL HISTOPATHOLOGY

CROSS REFERENCE TO RELATED APPLICATIONS

This application claims priority to U.S. Provisional Patent Application No. 61/149,158 filed on Feb. 2, 2009, the disclosure of which is hereby incorporated by reference in its entirety.

FIELD OF THE INVENTION

This invention concerns a computer-aided prognosis (CAP) system and method that employs quantitatively derived image information to predict pathological processes, disease outcome and patient survival. While digital pathology has made tissue specimens amenable to computer-aided diagnosis (CAD) for disease detection, the CAP system and method of the present invention predicts disease outcome and patient survival.

BACKGROUND

The current gold standard in identifying many disease states is the subjective visual interpretation of microscopic histology of fixed tissue sections of the involved organ. Examples of this include the diagnosis of cancer as well as many inflammatory and degenerative diseases. Over the past decade, the increasing ability to assay genomic information led to improved classification of a variety of pathological processes using diagnostic, prognostic patterns of gene expression and/or genomic changes. The present invention details an automated, computerized system and method for analyzing histopathology imagery that will produce a quantitative and reproducible metric, i.e. Image-based Risk Score, for predicting disease outcome and patient survival. Following are two specific embodiments of the present invention that use breast cancer as a model disease state where well-validated gene expression-based classifiers have led to significant clinical impact.

Breast cancer (BC) is one of the leading causes of cancer-related deaths in women, with an estimated annual incidence greater than 192,000 in the United States in 2009 (source: American Cancer Society).

One embodiment of the present invention involves a subset of BC that comprises cancer cells that have not spread to the lymph nodes and with overexpression of the estrogen receptor (LN−, ER+ BC). Although cases of LN−, ER+ BC are treated with a combination of chemotherapy and adjuvant hormone therapy, the specific prognosis and treatment is often determined by the Oncotype DX gene expression assay [1]. The Oncotype DX gene expression assay produces a Recurrence Score (RS) between 0-100 that is positively correlated to the likelihood for distant recurrence and the expected benefit from chemotherapy [1].

The manual detection of BC nuclei in histopathology is a tedious and time-consuming process that is unfeasible in the clinical setting. Previous approaches to cell segmentation—thresholding [2], clustering [3], and active contour models [4]—are not very robust to the highly variable shapes and sizes of BC nuclei, as well as artifacts in the histological fixing, staining, and digitization processes.

Previous work [1] has shown that the Oncotype DX RS is correlated with BC grade. Cancer grade reflects the architectural arrangement of the tissue and is correlated with survival (high grade implies poor outcome). Pathologists often disagree on the grade of a BC study. With the recent advent of digital pathology, researchers have begun to explore automated image analysis of BC histopathology. Wolberg et al. [6] used nuclear features from manually segmented BC nuclei to distinguish benign and malignant images. Bilgin et al. [7] explored the use of hierarchical graphs to model the architecture of BC histopathology. Textural features were used by Hall et al. [8] to examine variations in immunohistochemical staining.

A second embodiment of the present invention involves a subset of invasive BC that includes the presence of lymphocytic infiltration (LI) and exhibits amplification of the HER2 gene (HER2+ BC). Most HER2+ BC is currently treated with agents that specifically target the HER2 protein. Researchers have shown that the presence of LI in histopathology is a viable prognostic indicator for various cancers, including HER2+ BC [13]-[15]. The function of LI as a potential anti-tumor mechanism in BC was first shown by Aaltomaa et al. [14]. More recently, Alexe et al. [15] demonstrated a correlation between the presence of high levels of LI and tumor recurrence in early stage HER2+ BC. Pathologists do not routinely report on the presence of LI, especially in HER2+ BC. A possible reason for this is that pathologists currently lack the automated image analysis tools to accurately, efficiently, and reproducibly quantify the presence and degree of LI in BC histopathology.

While some researchers [9],[16]-[21] have recently begun to develop computer-aided diagnosis (CADx) system and methods for the analysis of digitized BC histopathology, they have mostly focused on either finding suspicious regions of interest (ROI) or have attempted to determine cancer grade from manually isolated ROIs. The methods for both applications use image-based features to discriminate between 2 classes: either normal and benign regions or low and high grade ROIs. Specifically, the size and shape of cancer nuclei have been shown to distinguish low and high grade histology images [16], [9]. Textural features and filter banks have also been employed [16]-[19], [21] to model the phenotypic appearance of BC histopathology.

While several researchers have been developing algorithms for detection of nuclei [18], [23]-[29] in digitized histopathology, there have been no attempts to automatically detect or quantify extent of LI on BC histopathology. Some popular approaches to automated nuclear detection are based on adaptive thresholding [18], [23] and fuzzy c-means clustering [25], [27]. These techniques rely on differences in staining to distinguish nuclei from surrounding tissue. However, they are not appropriate for the task of LI detection due to the similarity in appearance between BC and lymphocyte nuclei (FIG. 4(a)). Techniques such as active contours [24], [28], [29] have utilized gradient (edge) information to automatically isolate nuclei in histological images. These methods, however, might be limited in their ability to handle variations in the appearance of BC nuclei (FIGS. 4(b), (c)) and image acquisition artifacts (FIGS. 4(e), (f)). Some researchers have developed hybrid techniques in order to improve nuclear detection and segmentation results. For example, Glotsos et. al. [28] used Support Vector Machine clustering to improve initialization for active contour models. More recently, semi-automated probabilistic models have used pixel-wise intensity information to detect cancer [26] and lymphocyte nuclei [30] in digitized BC histopathology. Probabilistic models, however, are usually limited by the availability of expert-annotated training data.

Detection of lymphocytes alone, however, cannot completely characterize the abnormal LI phenotype because a baseline level of lymphocytes is present in all tissues. Gunduz et al. [20] explored automated cancer diagnosis by using hierarchical graphs to model tissue architecture, whereby a graph is defined as a set of vertices (nuclei) with corresponding edges connecting all nuclei.

SUMMARY OF THE INVENTION

The present invention relates to an image-based computer-aided prognosis (CAP) system that predict disease outcome and patient survival from digitized histopathology imagery. The present invention details an automated, computerized system and method for analyzing histopathology imagery that will produce a quantitative and reproducible metric, i.e. Image-based Risk Score, for predicting disease outcome and patient survival.

The present invention relates to an image-based computer-aided prognosis (CAP) system and method that seeks to replicate the prognostic power of molecular assays in histopathology and pathological processes, including but not limited to cancer.

In an embodiment of the present invention, an image-based computer-aided prognosis (CAP) system and method that seeks to replicate the prognostic power of molecular assays in cancer histopathology is developed. The system and method of the present invention involves first semi-automatically detecting BC nuclei via an Expectation Maximization driven algorithm. Using the nuclear centroids, two graphs (Delaunay Triangulation and Minimum Spanning Tree) are constructed and a total of 12 features are extracted from each image. A non-linear dimensionality reduction system and method, Graph Embedding, projects the image-derived features into a low-dimensional space, and a Support Vector Machine classifies the BC images in the reduced dimensional space. Using only the tissue slide samples, a mechanism for digital slide scanning, and a computer, the image-based CAP system and method of the present invention aims to overcome many of the drawbacks associated with Oncotype DX, including the high cost associated with the assay; limited laboratory facilities with specialized equipment, and length of time between biopsy and prognostic prediction.

The present invention involves key methodological contributions and the use of several state of the art machine learning system and methods, including, but not limited to: a robust, efficient method to automatically detect BC nuclei; image features to describe the architectural arrangement of BC nuclei and hence, quantitatively describe cancer grade, and the use of non-linear dimensionality reduction to classify and visualize the underlying biological data structure in a low-dimensional representation.

It is an object of the present invention to provide a semi-automated nuclear detection system and method based on the Expectation Maximization (EM) algorithm.

In accordance with the above object, the present invention derives architectural features to characterize the arrangement of BC nuclei and hence capture BC grade.

In an embodiment of the present invention, a computerized system and method is disclosed to automatically detect and grade the extent of LI in digitized HER2+ BC histopathology. Lymphocytes are first automatically detected by a combination of region growing and Markov Random Field algorithms. Using the centers of individual detected lymphocytes as vertices, three graphs (Voronoi Diagram, Delaunay Triangulation, and Minimum Spanning Tree) are constructed and a total of 50 image-derived features describing the arrangement of the lymphocytes are extracted from each sample. A non-linear dimensionality reduction system and method, Graph Embedding, is then used to project the high-dimensional feature vector into a reduced 3D embedding space. A Support Vector Machine classifier is used to discriminate samples with high and low LI in the reduced dimensional embedding space.

An embodiment of the present invention relates to an image-based risk score predictor method for measuring cancer extent to evaluate disease outcome in cancer patients using digitized histopathology comprising: i. scanning stained histopathology slides into a computer using a high resolution whole slide scanner; ii. detecting cancer nuclei using an Expectation-Maximization based algorithm; iii. constructing the Delaunay Triangulation and Minimum Spanning Tree graphs using the centers of individual detected cancer nuclei as vertices; iv. extracting image-derived features describing the arrangement of the cancer nuclei from each image; v. projecting high-dimensional image derived feature vector into a reduced 3D embedding space via Graph Embedding; vi. unwrapping the 3D embedding into a 1D scale to define image-based risk scores for poor, intermediate, and good outcome; vii. determining an image-based recurrence score to distinguish between low, intermediate, and high cancer grades by uncovering the grade labels of the samples on the 1D line and their relative locations to predict prognosis.

An embodiment of the present invention relates to an image-based risk score predictor method for measuring extent of pathological processes to evaluate disease outcome in patients using digitized histopathology comprising: i. scanning stained histopathology slides into a computer using a high resolution whole slide scanner; ii. detecting pathological nuclei using an Expectation-Maximization based algorithm; iii. constructing the Delaunay Triangulation and Minimum Spanning Tree graphs using the centers of individual detected pathological nuclei as vertices; iv. extracting image-derived features describing the arrangement of the pathological nuclei from each image; v. projecting high-dimensional image derived feature vector into a reduced 3D embedding space via Graph Embedding; vi. unwrapping the 3D embedding into a 1D scale to define image-based risk scores for poor, intermediate, and good outcome; vii. determining an image-based recurrence score to distinguish between low, intermediate, and high cancer grades by uncovering the grade labels of the samples on the 1D line and their relative locations to predict prognosis.

An embodiment of the present invention relates to an image-based risk score predictor method for measuring cancer extent to evaluate disease outcome in node-negative, estrogen receptor-positive breast cancer patients using digitized histopathology comprising: i. scanning stained histopathology slides into a computer using a high resolution whole slide scanner; ii. detecting cancer nuclei using an Expectation-Maximization based algorithm; iii. constructing the Delaunay Triangulation and Minimum Spanning Tree graphs using the centers of individual detected cancer nuclei as vertices; iv. extracting image-derived features describing the arrangement of the cancer nuclei from each image; v. projecting high-dimensional image derived feature vector into a reduced 3D embedding space via Graph Embedding; vi. unwrapping the 3D embedding into a 1D scale to define image-based risk scores for poor, intermediate, and good outcome; vii. determining an image-based recurrence score to distinguish between low, intermediate, and high cancer grades by uncovering the grade labels of the samples on the 1D line and their relative locations to predict prognosis.

An embodiment of the present invention relates to a method for measuring extent of lymphocytic infiltration to evaluate disease outcome in breast cancer patients expressing the human epidermal growth factor receptor 2 (HER2) comprising: i. scanning stained histopathology slides into a computer using a high resolution whole slide scanner; ii. detecting lymphocyte nuclei using a combination of region-growing and Markov Random Field algorithms; iii. constructing a Voronoi Diagram, Delaunay Triangulation, and Minimum Spanning Tree using the centers of individual detected lymphocyte nuclei as vertices; iv. extracting image-derived features describing the arrangement of the lymphocyte nuclei from each image; v. projecting high-dimensional image derived feature vector into a reduced 3D embedding space via Graph Embedding.

BRIEF DESCRIPTION OF THE DRAWINGS

FIG. 1(a) depicts a LN−, ER+ BC histopathology image. FIG. 1. (b) depicts a corresponding EM-based segmentation of BC nuclei. The segmentation in FIG. 1(b) is FIG. 1(c) smoothed to help detect individual nuclei. FIG. 1(d) depicts a final detected nuclear centroids (black dots) used for feature extraction.

FIG. 2(a) and FIG. 2(d) depict low and high grade LN−, ER+ BC samples. FIG. 2(b) and FIG. 2(e) depict Delaunay Triangulation. FIG. 2(c) and FIG. 2(f) depict Minimum Spanning Tree graphs overlaid.

FIG. 3 depicts Graph Embedding plots of architectural features show clear separation of different FIG. 3. FIG. 3(a) depicts BC grades. FIG. 3(b) depicts RS labels. The embeddings are projected into a 1D line, where FIG. 3(c) depicts BC grade and FIG. 3(d) depicts RS defined by a single score.

FIG. 4(a) depicts the similarity in appearance between a cancer cell nucleus and a lymphocyte nucleus. In general, lymphocyte nuclei are distinguished from cancer cell nuclei by their smaller size, more circular shape, and a darker, homogeneous staining. Additional challenges include variations in the appearance of FIG. 4(b), FIG. 4(c) depicts BC nuclei within a single histopathology slide, FIG. 4(d) depicts the presence of fat among cancerous tissue, FIG. 4(e) depicts histological fixing, and FIG. 4(f) depicts slide digitization artifacts.

FIG. 5 depicts a flowchart illustrating the 4 main steps in the CADx system and method for LI-based stratification of HER2+ BC histopathology. Automated lymphocyte detection is followed by feature extraction of architectural and morphological features. The high-dimensional feature space is then non-linearly embedded into a reduced dimensional space via Graph Embedding, which allows for data visualization and subsequent evaluation via a SVM classifier.

FIG. 6 depicts a flowchart illustrating the main steps in the automated lymphocyte detection system and method.

FIG. 7 depicts a schematic illustrating the iterative growth of a region r. After initialization of the current region SCR (as depicted in FIG. 7(a)), current boundary $S_{CB}$, and bounding box $S_{BB}$, new pixels are added iteratively (as depicted in FIG. 7(b)). When a new pixel (outlined in white) is added to $S_{CR}$, the boundaries $S_{CB}$ and $S_{IB}$ are adjusted accordingly as depicted in FIG. 7(c)).

FIG. 8(a) and FIG. 8(e) depict luminance channels of two different HER2+ BC histopathology studies. FIG. 8(b) and FIG. 8(f) depict corresponding initial region-growing based lymphocyte detection. FIG. 8(c) and FIG. 8(g) depict preliminary Bayesian refinement showing detected BC nuclei (light circles) and detected lymphocyte nuclei (dark circles). FIG. 8(d) and FIG. 8(h) depict final lymphocyte detection result after the MRF pruning step.

FIG. 9 depicts probability density functions (PDFs) estimated from empirical training data and modeled via weighted sum of gamma distributions for FIG. 9 (a), FIG. 9 (c) $w_l$ and FIG. 9 (b), FIG. 9 (d) $w_b$ classes for FIG. 9 (a), FIG. 9 (b) square root of area and FIG. 9 (c), FIG. 9 (d) variance in luminance of each r∈R. In each distribution depicts in FIGS. 9(a)-(d), the estimated parametric model is overlaid.

FIG. 10 depicts two different HER2+ breast cancer histopathology images with FIG. 10 (a) high and FIG. 10 (b) low levels of LI. FIG. 10((b) and FIG. 10 (f)) show the corresponding Voronoi Diagrams constructed using the automatically detected lymphocyte centers as vertices of the graph. Corresponding Delaunay Triangulation and Minimum Spanning Tree graphs are shown in FIGS. 10((c), (g)) and 10((d), (h)), respectively.

FIG. 11 depicts a histogram of the partial, directed Hausdorff distances $\Phi_H(O^{auto}, O^{auto})$ between automatically and manually detected lymphocyte nuclei in all 41 BC histopathology images. The dashed line denotes the median of the errors of the automated lymphocyte detection system and method.

FIG. 12 depicts the mean ($\mu_{ACC}$) classification accuracy over 100 trials of 3-fold cross-validation is shown for different dimensionalities {2, 3, . . . , 10} obtained via Graph Embedding. The error bars represent standard deviation ($\sigma_{ACC}$) of the classification accuracy.

FIG. 13 depicts all 41 images plotted in the Graph Embedding reduced 3-dimensional Eigen space for the architectural feature set derived from FIG. 13(a) manual and FIG. 13(b) automated lymphocyte detection. Embeddings of the Varma-Zisserman features are shown for FIG. 13 (c) K=3 and FIG. 13(d) K=5. The labels denote samples with low LI (circles), medium LI, (squares), and high LI (triangles) as determined by an expert oncologist. Note that GE with the architectural features reveals the presence of an underlying manifold structure showing a smooth continuum of BC samples with low, medium, and high levels of LI.

DETAILED DESCRIPTION

An image analysis system that can reproducibly and quantitatively characterize tissue architecture can be used to predict patient outcome.

The present invention relates to an image-based computer-aided prognosis (CAP) system and method that seeks to replicate the prognostic power of molecular assays in histopathology and pathological processes, including but not limited to cancer.

The present invention involves key methodological contributions and the use of several state of the art machine learning system and methods, including, but not limited to: a robust, efficient method to automatically detect BC nuclei; image features to describe the architectural arrangement of histological structures; and the use of non-linear dimensionality reduction to classify and visualize the underlying biological data structure in a low-dimensional representation.

The present invention relates to a semi-automated nuclear detection system and method based on the Expectation Maximization (EM) algorithm. The present invention relates to a semi-automated nuclear detection system and method based on the Expectation Maximization (EM) algorithm. Additional information regarding Expectation Maximiation algorithm may be found in: Fatakdawala, H., Basavanhally, A., Xu, J., Ganesan, S., Feldman, M., Tomaszewski, J., Madabhushi, A., Expectation Maximization driven Geodesic Active Contour with Overlap Resolution (EMaGACOR): Application to Lymphocyte Segmentation on Breast Cancer Histopathology, IEEE Trans. on Biomedical Engineering, 2010 (in press)" which is incorporated by reference herein.

In the present invention, architectural features are derived to characterize the arrangement of cancer nuclei, including but not limited to breast cancer nuclei. In Doyle et al. [9], different graphs were constructed using BC nuclei as vertices and the quantitative features derived from these graphs were used to successfully stratify BC grade. In the present invention, Graph Embedding (GE), a nonparametric type of nonlinear dimensionality reduction[9], is employed to project the image-derived features from each BC tissue specimen onto a reduced 3D space, and subsequently, down to a 1D line. A Support Vector Machine (SVM) classifier [10] is employed to evaluate the discriminability of the architectural features with respect to BC grade in the reduced 3D space. The further projection of the image data to a 1D line allows us to define image-based risk scores, analogous to the Oncotype DX RS, for poor, intermediate, and good outcome. This image-based risk score predictor could potentially supplant Oncotype DX to predict BC outcome and survival.

In an embodiment of the present invention, a computerized system and method is disclosed to automatically detect and grade the extent of LI in digitized HER2+ BC histopathology. Lymphocytes are first automatically detected by a combination of region growing and Markov Random Field algorithms. Using the centers of individual detected lymphocytes as vertices, three graphs (Voronoi Diagram, Delaunay Triangulation, and Minimum Spanning Tree) are constructed and a total of 50 image-derived features describing the arrangement of the lymphocytes are extracted from each sample. A nonlinear dimensionality reduction system and method, Graph Embedding, is then used to project the high-dimensional feature vector into a reduced 3D embedding space. A Support Vector Machine classifier is used to discriminate samples with high and low LI in the reduced dimensional embedding space.

An embodiment of the present invention relates to an image-based risk score predictor method for measuring cancer extent to evaluate disease outcome in cancer patients using digitized histopathology comprising: i. scanning stained histopathology slides into a computer using a high resolution whole slide scanner; ii. detecting cancer nuclei using an Expectation-Maximization based algorithm; iii. constructing the Delaunay Triangulation and Minimum Spanning Tree graphs using the centers of individual detected cancer nuclei as vertices; iv. extracting image-derived features describing the arrangement of the cancer nuclei from each image; v. projecting high-dimensional image derived feature vector into a reduced 3D embedding space via Graph Embedding; vi. unwrapping the 3D embedding into a 1D scale to define image-based risk scores for poor, intermediate, and good outcome; vii. determining an image-based recurrence score to distinguish between low, intermediate, and high cancer grades by uncovering the grade labels of the samples on the 1D line and their relative locations to predict prognosis.

An embodiment of the present invention relates to an image-based risk score predictor method for measuring extent of pathological processes to evaluate disease outcome in patients using digitized histopathology comprising: i. scanning stained histopathology slides into a computer using a high resolution whole slide scanner; ii. detecting pathological nuclei using an Expectation-Maximization based algorithm; iii. constructing the Delaunay Triangulation and Minimum Spanning Tree graphs using the centers of individual detected pathological nuclei as vertices; iv. extracting image-derived features describing the arrangement of the pathological nuclei from each image; v. projecting high-dimensional image derived feature vector into a reduced 3D embedding space via Graph Embedding; vi. unwrapping the 3D embedding into a 1D scale to define image-based risk scores for poor, intermediate, and good outcome; vii. determining an image-based recurrence score to distinguish between low, intermediate, and high cancer grades by uncovering the grade labels of the samples on the 1D line and their relative locations to predict prognosis.

An embodiment of the present invention relates to an image-based risk score predictor method for measuring cancer extent to evaluate disease outcome in node-negative, estrogen receptor-positive breast cancer patients using digitized histopathology comprising: i. scanning stained histopathology slides into a computer using a high resolution whole slide scanner; ii. detecting cancer nuclei using an Expectation-Maximization based algorithm; iii. constructing the Delaunay Triangulation and Minimum Spanning Tree graphs using the centers of individual detected cancer nuclei as vertices; iv. extracting image-derived features describing the arrangement of the cancer nuclei from each image; v. projecting high-dimensional image derived feature vector into a reduced 3D embedding space via Graph Embedding; vi. unwrapping the 3D embedding into a 1D scale to define image-based risk scores for poor, intermediate, and good outcome; vii. determining an image-based recurrence score to distinguish between low, intermediate, and high cancer grades by uncovering the grade labels of the samples on the 1D line and their relative locations to predict prognosis.

An embodiment of the present invention relates to a method for measuring extent of lymphocytic infiltration to evaluate disease outcome in breast cancer patients expressing the human epidermal growth factor receptor 2 (HER2) comprising: i. scanning stained histopathology slides into a computer using a high resolution whole slide scanner; ii. detecting lymphocyte nuclei using a combination of region-growing and Markov Random Field algorithms; iii. constructing a Voronoi Diagram, Delaunay Triangulation, and Minimum Spanning Tree using the centers of individual detected lymphocyte nuclei as vertices; iv. extracting image-derived features describing the arrangement of the lymphocyte nuclei from each image; v. projecting high-dimensional image derived feature vector into a reduced 3D embedding space via Graph Embedding.

DETAILED DESCRIPTION OF THE PREFERRED EMBODIMENTS

Exemplary Embodiment 1

Automated Detection of Nuclei Using EM-Based Gaussian Mixture

The present invention relates to an image-based computer-aided prognosis (CAP) system and method that seeks to replicate the prognostic power of molecular assays in BC histopathology. Using only the tissue slide samples, a mechanism for digital slide scanning, and a computer, our image-based CAP system and method aims to overcome many of the drawbacks associated with Oncotype DX, including the high cost associated with the assay; limited laboratory facilities with specialized equipment, and length of time between biopsy and prognostic prediction.

Dataset

A total of 37 hematoxylin and eosin (H & E) stained breast histopathology images were collected from a cohort of 17 patients and scanned into a computer using a high resolution whole slide scanner at 20× optical magnification. For all methods, we define the data set $Z=\{C_1, C_2, \ldots, C_M\}$ of M images, where an image $C=(C, g)$ is a 2D set of pixels $c \in C$ and g is the associated intensity function. Each C is associated with an architectural feature set F(C), an Oncotype DX RS $L^{RS}(C) \in \{1, 2, \ldots, 100\}$, and BC grade $L^{GR}(C) \in \{LG, MG, HG\}$, where LG, MG, and HG represent low-, medium-, and high-grade cancer, respectively. The 37 samples were also classified based on their RS, where $L^{RS}$ is binned into good (RS<22), intermediate (23<RS≤30), and poor (31<RS<100) prognosis categories.

EM-Based Segmentation of Cancer Nuclei

To segment BC nuclei, each image C is modeled as a Gaussian mixture of K=5 components, where $\kappa = \{1, 2, \ldots, K\}$. We optimize the model parameter set $\gamma^i = \{\mu_\kappa^i, \sigma_\kappa^i, p_\kappa^i, \forall \kappa\}$, comprising the mean $\mu_\kappa$, covariance $\sigma_\kappa$, and a priori probability $p_\lambda$ at iteration i. The mixture is initialized to $-\gamma^0$ via K-means clustering of RGB values over all $c \in C$. The Expectation step calculates the posterior probability $$p^i(\kappa \mid g(c)) = \frac{p_\kappa^i N(g(c) \mid \mu_\kappa^i, \sigma_\kappa^i)}{\sum_{j=1}^{K} p_j^i N(g(c) \mid \mu_j^i, \sigma_j^i)},$$

where $N(g(c) \mid \mu_\kappa, \sigma_\kappa)$ represents the value of Gaussian component $\kappa$ at intensity g(c). The Maximization step uses $p^i$ to calculate $\gamma^{i+1} = \{\mu_\eta^{i+1}, \sigma_\kappa^{i+1}, p_\kappa^{i+1}\}$ [5]. The EM algorithm converges when $\|(L^{i+1} - L^i)/L^i\|_2 < \epsilon$, where $L^i$ is the log likelihood of the Gaussian mixture model with parameters $\gamma^i$ and $\epsilon = 10^{-5}$ is determined empirically. Based on posterior probability, a grayscale "scene" over all $c \in C$ (FIG. 1(b)) is saved for each $\kappa = \{1, 2, \ldots, K\}$.

The scene that best represents BC nuclei (FIG. 1(b)) is selected manually and smoothed (FIG. 1(c)) to reduce intra-nuclear intensity variations. Morphological and connected component operations are then applied to identify individual objects corresponding to BC nuclei and the corresponding set of n nuclear centroids $V = \{v_1, v_2, \ldots, v_n\}$ is found for each $C \in Z$ (FIG. 1(d)).

Feature Extraction

A complete, undirected graph $G = \{V, E, W\}$ is defined by a vertex-set of nuclear centroids V, an edge-set $E = \{E_1, E_2, \ldots, E_m\}$ connecting the nuclear centroids such that $(v_1, v_2) \in E$ with $v_1, v_2 \in V$, and a set of weights $W = \{W_1, W_2, \ldots, W_m\}$ proportional to the length of each $E \in E$. A total of 12 architectural features are extracted for each image based on the Delaunay Triangulation and a Minimum Spanning Tree [9] (FIG. 2). Below we describe the construction of these 2 graphs.

Delaunay Triangulation

A Delaunay graph $G_D = (V, E_D, W_D)$ (FIG. 2(b)) is a spanning subgraph of G that is easily calculated from the Voronoi Diagram R. Each R is defined by a set of polygons $P = \{P(v_1), P(v_2), \ldots, P(v_n)\}$ surrounding all nuclear centroids V. Each pixel $c \in C$ is linked to the nearest $v \in V$ (via Euclidean distance) and added to the associated polygon $P(v) \in P$. The Delaunay graph $G_D$ is simply the dual graph of R and is constructed such that if $P(v_a), P(v_b) \in P$ share a side, their nuclear centroids $v_a, v_b \in V$ are connected by an edge $(v_a, v_b) \in E_D$. The mean, standard deviation, minimum/maximum (min/max) ratio, and disorder are calculated for the side length and area of all triangles in $G_D$, providing a set of 8 features $f_D$ for each $C \in Z$.

Minimum Spanning Tree

A spanning tree $G_S = (V, E_S, W_S)$ refers to any spanning subgraph of G. The total weight $\hat{W}_S$ for each subgraph is calculated by summing all individual weights $W \in W_S$. The Minimum Spanning Tree (FIG. 2(c)) $G_{MST} = \arg\min_{G_S \in G} \hat{W}_S$ is the subgraph with the lowest total weight. The mean, standard deviation, min/max ratio, and disorder of the branch lengths in $G_{MST}$ provide a set of 4 features $f_{MST}$ for each $C \in Z$.

Dimensionality Reduction Using Graph Embedding and Support Vector Machine Based Classification

Projecting Data to a 3D Space Via Graph Embedding

We use Graph Embedding (GE) to transform the architectural feature set into a low-dimensional embedding [9]. For each $C \in Z$, a 12-dimensional architectural feature set is defined as the superset $F(C) = \{f_D, f_{MST}\}$ containing all features derived from Delaunay Triangulation and Minimum Spanning Tree. Given histopathology images $C_a, C_b \in Z$, a confusion matrix $W(a,b) = \exp(-\|F(C_a) - F(C_b)\|_2) \in \mathbb{R}^{M \times M}$ is first constructed $\forall a,b$. The optimal embedding vector F' is obtained from the maximization of the function, $$\varepsilon(F') = 2(M-1) \cdot \text{trace}\left[\frac{F'^T(\mathcal{A} - W)F'}{F'^T \mathcal{A} F'}\right],$$

where $\mathcal{A}(a,a) = \Sigma_b W(a,b)$. The low-dimensional embedding space is defined by the Eigen vectors corresponding to the $\beta$ smallest Eigen values of $(\mathcal{A} - W))F'' = \lambda \mathcal{A} F'$.

Reducing the high-dimensional feature space to a 3D Eigen subspace allows us to evaluate the discriminability of the image-derived features in distinguishing samples with different cancer grade patterns and hence different prognoses.

SVM-Based Classification Via Cross-Validation

A support vector machine (SVM) classifier [10] is trained using image-derived features to distinguish images with different grades using a k-fold cross-validation system and method. The data set Z is divided into training $Z_{tra}$ and testing $Z_{tes}$ subsets, where $Z_{tra} \cap Z_{tes} = \emptyset$. The SVM classifier projects $F(Z_{tra})$ onto a higher dimensional space using a linear kernel and the hyperplane that most accurately separates the two classes is determined. The classifier is evaluated by projecting $F(Z_{tes})$ and comparing all $C \in Z_{tes}$ to the hyperplane. Image C is said to be correctly classified if its SVM-derived class matches the clinician's ground truth label.

SVM training is performed via stratified, randomized k-fold cross-validation algorithm, whereby Z is divided randomly into k subsets. The samples from k−1 subsets are pooled into $Z_{tra}$ and the remaining subset is used as $Z_{tes}$. For each of the k iterations, a different subset is used as $Z_{tes}$ while the remaining subsets are used for $Z_{tra}$. Using a value of k=3, the entire cross-validation algorithm is repeated for 100 trials and the resulting mean $\mu_{ACC}$ and standard deviation $\sigma_{ACC}$ of the classification accuracy are determined.

Geodesic Distance-Based Projection from 3D to 1D

The 3D GE manifold can be "unwrapped" into a 1D (linear) space simply by selecting the image $C_1$ at one end of the manifold as an anchor point and using the Euclidean distance metric to find the next image nearest to it on the 3D manifold. By using $C_a$ as the new anchor point, this process is repeated until all $C \in Z$ are included. Thus the geodesic distances between all scenes C embedded on the manifold are determined and GE is again employed to project the data down to a 1D line. By uncovering the grade (outcome) labels of the samples on this 1D projection and their relative locations, an image-based recurrence score can be determined to distinguish between low, intermediate, and high BC grades (and hence outcomes). For any new image $C_b$ projected onto this line, the relative distance of $C_b$ from poor, intermediate, and good outcome samples on the trained manifold will enable prediction of prognosis for $C_b$.

Results and Discussion

Image-Based Discrimination of Grade

A SVM trained via 3-fold cross-validation on the unreduced F and reduced (3D) F' architectural feature sets was able to distinguish high and low grade BC histopathology images with classification accuracies of 74.82%±5.74% and 84.12%±5.42%, respectively, over 100 runs (Table 1). These results appear to confirm that GE has embedded the architectural feature set without any significant loss of information. The success of the architectural features is confirmed qualitatively by the clear separation between high and low BC grade on the 3D manifold (FIG. 3(a)).

TABLE 1

$\mu_{ACC}$ and $\sigma_{ACC}$ over 100 trials of 3-fold cross-validation for both automatically and manually detected BC nuclei. Results are reported for the original F and low-dimensional F' feature sets using both the RS ($L^{RS}$) and cancer grade ($L^{GR}$) labels.

|  | Automated Detection | Manual Detection |
|---|---|---|
| RS (F') | 84.15% ± 3.10% | 71.92% ± 4.66% |
| Grade (F') | 84.12% ± 5.42% | 85.71% ± 4.89% |
| RS (F) | 84.56% ± 2.69% | 71.65% ± 5.88% |
| Grade (F) | 74.82% ± 5.74% | 85.00% ± 4.51% |

Correlation Between Image-Based Signatures in Grade Discrimination and Oncotype DX Recurrence Scores Replacing the grade labels with the RS labels, the SVM trained via 3-fold cross-validation on F' and F yielded classification accuracies of 84.15%±3.10% and 84.56%±2.69%, respectively (Table 1). This shows that a correlation exists between molecular prognostic assays such as Oncotype DX and the spatial arrangement of nuclei and histological structures in BC histopathology. The 3D manifolds in FIGS. 3(a), (b) reveal a similar underlying biological stratification that exists in BC grade and Oncotype DX RS, in turn suggesting that the quantitative image information employed to characterize BC grade could recapitulate the prognostic capabilities of Oncotype DX. The curvilinear 3D manifold on which the different BC grades (low to high) reside in a smooth continuum may potentially offer insight into BC biology as well.

Creating an Image-Based Assay Using 1D Projection

FIGS. 3(c), (d) represent the 1D projections of the 3D manifolds shown in FIGS. 3(a), (b), respectively. The manifolds reveal a smooth, continuous progression from low to medium to high levels in terms of both RS and histological (grade) for all LN−, ER+ BC samples considered. The similarity between the 1D manifolds (FIGS. 3(c), (d)) suggest that our image-based CAP system can be used to generate a prognostic assay to predict survival scores in much the same way as Oncotype DX.

Exemplary Embodiment 2

The ability to automatically detect LI would be invaluable to BC pathologists and oncologists, since manual detection of individual lymphocyte nuclei in BC histopathology is a tedious and time-consuming process that is not feasible in the clinical setting. The availability of a computerized image analysis system and method for automated quantification of LI extent in HER2+ BC will enable development of an inexpensive image-based system for predicting disease survival and outcome.

An important prerequisite for extracting histopathological image attributes to model BC appearance is the ability to automatically detect and segment histological structures, including nuclei and glands. Consequently the ability of an image analysis system and method to grade the extent of LI in a BC histopathology image is dependent on the algorithm's ability to automatically detect lymphocytes. Automated lymphocyte detection, however, is a non-trivial task complicated by the intrinsic similarity in appearance of BC nuclei and lymphocyte nuclei on hematoxylin and eosin (H & E) stained breast biopsy samples (FIG. 4(a)). In addition, even within a particular slide, the morphology of BC nuclei is highly heterogeneous due to variations in cancer grade and mitotic phase (FIGS. 4(b), (c)) [22]. Biological differences such as the presence of fat deposits (FIG. 4(d)) can confound algorithms that rely on boundary detection alone. Preparation issues such as "cutting artifact" (FIG. 4(e)) and digitization misalignment (FIG. 4(f)) lead to similar problems, but are more difficult to predict and correct for since they are unrelated to the underlying biology.

To address some of the challenges in automated detection of lymphocytes (as illustrated in FIG. 4), the present invention provides a computerized image analysis system and method that combines a region-growing algorithm with Maximum a Posteriori (MAP) estimation and Markov Random Field (MRF) theory [31]. First, all candidate BC and lymphocyte nuclei are detected via a region-growing algorithm that uses contrast measures to find optimal boundaries [31], [32]. By growing outward from the center of each nucleus, this technique is robust to artifacts outside of the nuclei (FIGS. 4(d)-(f)). The region-growing algorithm has high detection sensitivity, resulting in a large number of lymphocyte and non-lymphocyte nuclei being detected. MAP estimation improves detection specificity by incorporating size and luminance information from each detected object to temporarily label it as either a BC or lymphocyte nucleus (these being the 2 main classes of objects detected). MRF theory [31], [33] then allows us to improve lymphocyte detection specificity by modeling the infiltration phenomenon in terms of spatial proximity, whereby an object is more likely to be labeled as a lymphocyte nucleus if it is surrounded by other lymphocyte nuclei. The application of MRF is a unique step that exploits the spatial properties of LI to (1) distinguish nuclei that would be otherwise misclassified (FIG. 4(a)) and (2) isolate infiltrating lymphocytes from the surrounding baseline level of lymphocytes. We achieve MAP estimation by using the Iterated Conditional Modes algorithm, a fast and simple method for maximizing the posterior probability that a detected object is indeed a lymphocyte [31], [34].

The importance of using graph algorithms to quantitatively describe the spatial arrangement of nuclei in distinguishing cancer grade in both prostate cancer and BC histopathology has been previously shown [9], [35]. In [9], quantitative features derived from graphs (Voronoi Diagram, Delaunay Triangulation, and Minimum Spanning Tree) constructed using BC nuclei as vertices were used to successfully stratify low, intermediate, and high BC grade on digitized histopathology.

The present invention quantifies the extent of LI in HER2+ BC histopathology by extracting graph-based and nuclear features to characterize the architectural arrangement and morphological appearance of lymphocytes [9]. Traditional textural signatures such as first order grey level features, second order Haralick statistics, and Gabor filter features were not considered in the present invention because they have been shown to be unsuitable for CADx applications in breast and prostate cancer that rely on spatial information [9], [35].

While a large set of descriptive features is certainly desirable for modeling biological processes such as LI, a high-dimensional feature space also presents problems for data classification analysis. First, the curse of dimensionality [36] affects computational efficiency due to the exponential increase in data volume required for each additional feature. Further, it is impossible to directly visualize the relationships between images in a high-dimensional space. The present invention addresses both issues by utilizing Graph Embedding (GE) [9], [37], a nonparametric, non-linear dimensionality reduction system and method [38], to first project the image-derived features onto a reduced 3D space while simultaneously preserving object-class relationships. Thus, 2 samples with low levels of LI would be projected relatively close to each other and relatively farther from a sample with a high level of LI.

A Support Vector Machine (SVM) classifier [38], [39] is then employed in the reduced dimensional space to discriminate between images with high and low LI. We have previously shown the utility of SVM classifiers in conjunction with architectural and morphological image features to distinguish malignant and benign BC samples and also for distinguishing between different grades of BC [9] and prostate cancer [35]. SVM results for our architectural features are also compared against results from the popular, unsupervised Varma-Zisserman (VZ) texton-based system and method.

The main components of the methodology for automated detection and stratification of LI on BC histopathology of the present invention is illustrated in the flowchart in FIG. 5.

Dataset Description and Notation

A total of 41 hematoxylin and eosin (H & E) stained breast biopsy samples from 12 patients at The Cancer Institute of New Jersey (CINJ) were obtained and scanned into a computer using a high resolution whole slide scanner at 20× optical magnification (0.33 μm spatial resolution). The size of each image falls within $600 \leq U_X \leq 700$ and $500 \leq U_Y \leq 600$, where $U_X$ and $U_Y$ are the width and height, respectively, in pixels. These images were separated into 3 classes by a BC oncologist based on the extent of LI. The dataset comprises 22 low, 10 medium, and 9 high LI samples. For the purpose of quantitative classification (as described in Section VI-B), the oncologist separated the images into two classes comprising 22 low LI and 19 high LI samples, respectively.

We define a dataset $Z=\{C_1, C_2, \ldots, C_M\}$ of M images. An image scene $C \in Z$ is defined as $C=(C, g)$, where C is a 2D set of pixels $c \in C$ and g is the associated luminance function from the CIE-Lab color space [41]. A list of symbols and notation commonly used in this paper is shown in Table 2. The CIE-Lab color space has the advantage of being more perceptually uniform and more robust to variations in staining and digitization than RGB space (FIG. 4 (a)) [20], [40].

TABLE 1

A list of key notation used in this paper.

| Symbol | Description |
|---|---|
| $Z=\{C_1, C_2, \ldots, C_M\}$ | HER2+ BC histopathology dataset comprising $M$ digitized images |
| $C = (C, g)$ | Image scene defined by a set of pixels $(C)$ and luminance function $(g)$ |
| $N = \{n_1, n_2, \ldots, n_N\}$ | $N$ candidate lymphocyte nuclei centers in image scene $C$ |
| $R = \{r_1, r_2, \ldots, r_N\}$ | $N$ candidate regions grown from N |
| $O = \{o_1, o_2, \ldots, o_L\}$ | $L$ finalized lymphocyte nuclei centers in image scene $C$, where $O \subseteq N$ |
| $R$ | Set of pixels representing lymphocyte nucleus region $S^*_{CR}$ |
| $X_r \in \{\omega_b, \omega_l\}$ | Random variable denoting class BC ($\omega_b$) or lymphocyte ($\omega_l$) nucleus for each region $r \in R$ |
| $Y_r = [A_r, \sigma_r]^T \in \mathbb{R}^{+2}$ | Random variable denoting features square root of area (A) and std. dev. intensity ($\sigma$) for each region $r \in R$ |
| $x_r, y_r$ | Specific instances of $X_r$ and $Y_r$ |
| $x, y$ | Sets of $x_r, \forall r \in R$ and $y_r, \forall r \in R$ |
| $\mathcal{G} = \{O, E, W\}$ | Graph with vertex-set $O$, edge-set E, and weights W |
| $F(C)$ | Architectural feature set for image scene $C$ |
| $F'(C)$ | Low-dimensional embedding of architectural feature set for image scene $C$ |
| $Y(C) \in \{-1, -1\}$ | True label for image scene $C$ as determined by expert pathologist, such that +1 represents high LI and −1 represents low LI. |

Automated Nuclear Detection of Lymphocytes

Beginning with a set of N candidate lymphocyte nuclear centers $N=\{n_1, n_2, \ldots, n_N\}$, we attempt to identify a set of L finalized lymphocyte nuclei with centers given by $O=\{o_1, o_2, \ldots, o_L\}$, such that $O \subseteq N$. The following sections detail the region-growing, Maximum a Posteriori (MAP) estimation, and Markov Random Field (MRF) algorithms that comprise the lymphocyte detection module of our CADx system (FIG. 6).

A. Candidate Lymphocyte Detection Via Region-Growing

We first attempt to identify candidate image locations that could represent centers of lymphocytic nuclei. The region-growing algorithm exploits the fact that lymphocyte nuclei in the luminance channel are identified as continuous, circular regions of low intensity circumscribed by sharp, well-defined boundaries (FIG. 4). The image scene C is convolved with a Gaussian (smoothing) kernel at multiple scales $\sigma_G \in \{6,7,8\}$ μm to account for variations in lymphocyte size. After convolution at each scale, valleys (i.e. the darkest pixels) are found on the smoothed image based on local differences in luminance. These valleys define a set of seed points $N=\{n_1, n_2, \ldots, n_N\}$ that represent candidate lymphocyte centers on the original scene C. Each $n \in N$ is grown into a corresponding region $r \in R$ using the 4-step procedure described below. Additional details on the region-growing system and method may be obtained from Reference [32].

Step 1:

A set of current pixels $S_{CR}=\{n\}$ is initialized as shown in FIG. 7(a). The current boundary $S_{CB}$ is defined as the set of 8-connected pixels surrounding $S_{CR}$. A square bounding box $S_{BB}$ containing all pixels within a $12\sigma_G \times 12\sigma_G$ neighborhood around n is then constructed.

Step 2:

The pixel $c \in S_{CB}$ with the lowest intensity in the current boundary is identified. Pixel c is removed from $S_{CB}$ and added to $S_{CR}$. The current boundary $S_{CB}$ is updated to include every pixel $d \in S_{BB}$ that is an 8-connected neighbor of c and $d \notin S_{CR}$. A set of internal boundary pixels $S_{IB} \subset S_{CR}$ (FIGS. 7(b), (c)) is defined as all pixels in $S_{CR}$ that are 8-connected to any pixel in $S_{CB}$.

Step 3:

$\bar{g}_{IB}$ and $\bar{g}_{CB}$ are computed as the mean intensity of pixels in $S_{IB}$ and $S_{CB}$, respectively. The boundary strength is computed at each iteration as $\bar{g}_{IB} - \bar{g}_{CB}$.

Step 4:

Steps 2 and 3 are iterated until the current region $S_{CR}$ tries to add a pixel outside the bounding box $S_{BB}$. The optimal lymphocyte region $S_{CR}^*$ is identified at the iteration for which the boundary strength $\bar{g}_{IB} - \bar{g}_{CB}$ is maximum (FIGS. 8(b), (f)).

Since the region-growing procedure is repeated with seed points from a variety of smoothing scales $\sigma_G \in \{6,7,8\}$ μm, overlapping regions are resolved by discarding the region with the lower boundary strength. For the sake of convenience we will refer to $S_{CR}^*$ as R below.

B. Bayesian Modeling of Lymphocytic Infiltration Via Maximum a Posteriori Estimation The initial lymphocyte detection is refined by incorporating domain knowledge regarding lymphocyte size, luminance, and spatial proximity. Each $r \in R$ has two associated random variables: $X_r \in \Lambda \equiv \{w_b, w_l\}$ indicating its classification as either a breast cancer ($w_b$) or lymphocyte ($w_l$) nucleus and $Y_r \equiv [A_r, \tau_r]^T \in \mathbb{R}^{+2}$ denoting the two observed features $$A_r = \sqrt{|R|}, \quad (1)$$

$$\sigma_r = \sqrt{\frac{1}{|R|} \sum_{c \in R} (g(c) - \bar{g})^2}, \quad (2)$$

where $A_r$ is the square root of nuclear area (Equation 1), $\sigma_r$ is the standard deviation of luminance in the nuclear region (Equation 2), $|R|$ is the cardinality of R, and $$\bar{g} = \frac{1}{|R|} \sum_{c \in R} g(c)$$

is the average pixel intensity of R. The choice of the two features ($A_r$ and $\sigma_r$) is motivated by the fact that (a) BC nuclei are typically larger than lymphocyte nuclei and (b) BC and lymphocyte nuclei are significantly different in terms of the homogeneity of their luminance values. Specific instances of the random variables $X_r$ and $Y_r$ are denoted by $x_r \in \Lambda$ and $y_r = [A_r, \sigma_r]^T \in \mathbb{R}^{+2}$, respectively. We define the random variables collectively for all $r \in R$ as $X = \{X_1, X_2, \ldots, X_N\}$ and $Y = \{Y_1, Y_2, \ldots, Y_N\}$ with state spaces $\Omega = \Lambda^N$ and $\mathbb{R}^{+2 \times N}$, respectively. Instances of X and Y are denoted by variables $x = (x_1, x_2, \ldots, x_N) \in \Omega$ and $y = (y_1, y_2, \ldots y_n) \in \mathbb{R}^{+2 \times N}$.

The labels X=x, given the feature vectors Y=y, are estimated using Maximum a Posteriori (MAP) estimation [42], which advocates finding the x that maximizes the posterior probability $$p(x \mid y) = \frac{p(y \mid x) p(x)}{p(y)} \propto p(y \mid x) p(x), \quad (3)$$

where p(y|x) is the likelihood term and p(x), p(y) are prior distributions for x and y, respectively. Since maximization of Equation 3 is only with respect to x, the prior distribution p(y) is ignored.

1) Modeling Lymphocyte Features Via Trained Probability Distributions:

The likelihood term p(y|x) in Equation 3 is calculated from probability density functions (PDFs), where x is provided by manual delineation of lymphocytes in a training set. Under the assumption that y is independent and identically distributed, the likelihood term in Equation 3 can be simplified such that $$p(y \mid x) = \prod_{r \in R} p(y_r \mid x_r). \quad (4)$$

Each 2-dimensional probability density function (PDF) is modeled as the product of two independent distributions: $p(y_r|x_r) = F(A_r|x_r)F(\sigma_r|x_r)$. Thus we require four one-dimensional PDFs $F(A_r|w_b)$, $F(A_r|w_l)$, $F(\sigma_r|w_b)$, and $F(\sigma_r|w_l)$ as shown in FIG. 9. To reduce local irregularities and create a smooth, continuous distribution, the one-dimensional PDFs are modeled by mixtures of Gamma distributions [42]

$$\Gamma(z; \delta, \phi, t) = \delta z^{t_1 - 1} \frac{e^{-z/\phi_1}}{\phi_1^{t_1} \Gamma(t_1)} + (1 - \delta) z^{t_2 - 1} \frac{e^{-z/\phi_2}}{\phi_2^{t_2} \Gamma(t_2)}, \quad (5)$$

where $z \in \mathbb{R}^+$, $\delta \in [0,1]$ is the mixing parameter, $t_1, t_2 > 0$ are the shape parameters, $\phi_1, \phi_2 > 0$ are the scale parameters, and $\Gamma$ is the Gamma function [42]. Calculating p(y|x) allows us to estimate Equation 3 and assign a tentative class $x_r \in \{w_b, w_l\}$ to each $r \in R$ (FIGS. 8(c), (g)).

2) Modeling Lymphocyte Proximity Via Markov Random Fields:

The prior distribution p(x) (Equation 3) is defined by a Markov Random Field (MRF). The Markov property [33] states that $$p(x_r | x_{-r}) = p(x_r | x_{\eta_r}), \quad (6)$$

where the neighborhood $\eta_r$ is empirically assumed to contain all regions within a 30 μm radius of r, $x_{-r} = \{x_s : s \in R, s \neq r\}$, and $x_{\eta_r} = \{x_s : s \in \eta_r\}$. We use the Iterated Conditional Modes (ICM) algorithm [34], a deterministic relaxation procedure, to perform MAP estimation (Equation 3) and assign a hard label $x_r \in \{w_b, w_l\}$ to each $r \in R$. Thus each region is classified as either a BC or lymphocyte nucleus (FIGS. 8(d), (h)). The regions labeled as BC nuclei are discarded, while centers of the L lymphocyte nuclei regions are computed and stored as $O = \{o_1, o_2, \ldots, o_L\}$.

Feature Extraction

We define the complete, undirected graph G=(O, E, W), where $O = \{o_1, o_2, \ldots, o_L\}$ is the set of vertices corresponding to the set of lymphocyte nuclear centroids, $E = \{E_1, E_2, \ldots, E_m\}$ is the set of edges connecting the nuclear centroids such that $\{(o_i, o_j) \in E : \forall o_i, o_j \in O, i, j \in \{1, 2, \ldots, L\}, i \neq j\}$, and $W = \{W_1, W_2, \ldots, W_m\}$ is a set of weights proportional to the length of each $E \in E$. To extract information about the arrangement of lymphocyte nuclei, we construct subgraphs representing the Voronoi Diagram $G_V$, Delaunay Triangulation $G_D$, and Minimum Spanning Tree $G_{MST}$ (FIG. 10). In addition, statistics describing the number and density of nuclei are calculated directly from O.

A. Voronoi Diagram

The Voronoi graph $G_V = (O, E_V, W_V)$ (FIGS. 10(b), (f)) is a spanning subgraph of G defined as a set of polygons $P = P_1, P_2, \ldots, P_L$ surrounding all nuclear centroids O [43]. Each pixel c∈C is linked with the nearest centroid o∈O (via Euclidean distance) and added to the associated polygon P∈P. The mean, standard deviation, minimum/maximum (min/max) ratio, and disorder (i.e. standard deviation divided by the mean) are calculated for the area, perimeter length, and chord length over all P, yielding a set of 13 features ($f_V$) for each scene C (Table II).

B. Delaunay Triangulation

The Delaunay graph $G_D$=(O, $E_D$, $W_D$) (FIGS. 10(c), (g)) is a spanning subgraph of and the dual graph of $G_V$ [43]. It is constructed such that if $P_i$, $P_j$∈P share a side, where i,j∈{1, 2, ..., L}, their nuclear centroids $o_i$, $o_j$∈O are connected by an edge $(o_i, o_j)$∈$E_D$. The mean, standard deviation, min/max ratio, and disorder are calculated for the side length and area of all triangles in $G_D$, yielding a set of 8 features ($f_D$) for each scene C (Table II).

C. Minimum Spanning Tree

A spanning tree $G_S$=(O, $E_S$, $W_S$) refers to any spanning subgraph of G [43]. The total weight $\ddot{W}_S$ for each subgraph is determined by summing all individual weights W∈$W_S$. The Minimum Spanning Tree $G_{MST}$ (FIGS. 10(d), (h)) is the spanning tree with the lowest total weight such that $G_{MST}$=arg $\min_{G_S \in G}[\ddot{W}_S]$. The mean, standard deviation, min/max ratio, and disorder of the branch lengths in $G_{MST}$ yield a set of 4 features ($f_{MST}$) for each scene C (Table II).

D. Nuclear Features

The global density $$\frac{L}{|C|}$$

of lymphocyte nuclei is calculated for each scene C, where L is the total number of detected lymphocytes and |C| represents the number of pixels (cardinality) in C. For any nuclear centroid $o_i$∈O, we define a corresponding nuclear neighborhood $\eta^\zeta(o_i)=\{o_j: \|o_i - o_j\|_2 < \zeta, o_j \in O, o_j \neq o_i\}$, where $\zeta$∈{10, 20, ..., 50} and $\|\cdot\|_2$ is the L2 norm. The mean, standard deviation, and disorder of $\eta^\zeta(o_i)$, $\forall o_i \in O$ are calculated. Additionally we estimate the minimum radius $\zeta^*$ such that $|\eta^{\zeta^*}(o_i)|$∈{3, 5, 7} and calculate the mean, standard deviation, and disorder over all $o_i$∈O. A total of 25 nuclear features ($f_{NF}$) are extracted for each scene C (Table II).

TABLE 2

A breakdown of the 50 architectural features, comprising 25 graph-based and 25 nuclear attributes.

| Feature Set | Description | No. of features |
|---|---|---|
| $f_V$ | Total area of all polygons<br>Polygon area: mean, std dev., min/max ratio, disorder<br>Polygon perimeter: mean, std dev., min/max ratio, disorder<br>Polygon chord length: mean, std dev., min/max ratio, disorder | 13 |
| $f_D$ | Triangle side length: mean, std dev., min/max ratio, disorder<br>Triangle area: mean, std dev., min/max ratio, disorder | 8 |
| $f_{MST}$ | Edge length: mean, std dev., min/max ratio, disorder | 4 |
| $f_{NF}$ | Density of nuclei<br>Distance to {3, 5, 7} nearest nuclei: mean, std dev., disorder<br>Nuclei in $\zeta \in$ {10, 20, ..., 50} pixel radius: mean, std dev., disorder | 25 |

Non-Linear Dimensionality Reduction Via Graph Embedding

Graph Embedding (GE) is employed to non-linearly transform the high-dimensional set of image features into a low-dimensional embedding while preserving relative distances between images from the original feature space [9]. For each scene C, a 50-dimensional image feature set is defined as the superset F={$f_V$, $f_D$, $f_{MST}$, $f_{NF}$} containing all features derived from the Voronoi Diagram, Delaunay Triangulation, Minimum Spanning Tree, and nuclear statistics. Given histopathology images $C_a$ and $C_b$ with corresponding image feature sets $F(C_a)$ and $F(C_b)$, where a,b∈{1, 2, ..., M}, a M×M confusion matrix $W_F(a,b)=\exp(-\|F(C_a)-F(C_b)\|_2) \in \mathbb{R}^{M \times M}$ is constructed. The optimal embedding vector F' is obtained from the maximization of the following function, $$\varepsilon(F') = 2(M-1) \cdot \text{trace}\left[\frac{F'^T(\mathcal{A} - W_F)F'}{F'^T \mathcal{A} F'}\right], \quad (7)$$

where A is a diagonal matrix defined $\forall a \in \{1, 2, ..., M\}$ as $A(a,a) = \Sigma_b W_F(a, b)$. The lower-dimensional embedding space is defined by the Eigen vectors corresponding to the β smallest Eigen values of $(A-W_F)F' = \lambda AF'$. In this work an empirically-determined value of β=3 was used. The matrix $F'(Z) \in \mathbb{R}^{M+\beta}$ of the first β Eigen vectors is constructed such that $F'(Z) = \{F'(C_1), F'(C_2), ..., F'(C_M)\}$.

Evaluation Methods

A. Hausdorff Distance for Evaluation of Automated Lymphocyte Detection System and Method The automated lymphocyte detection system and method is evaluated by the Hausdorff distance [44], a similarity measure used to compare the fidelity of automated detection against the "gold standard" obtained by manual inspection. For each image scene C, lymphocyte centroids from the automated (v∈$O^{auto}$) and manual (u∈$O^{man}$) detection system and methods are identified. The centroid locations in $O^{man}$ were estimated exhaustively by an expert pathologist who manually labeled the individual lymphocytes in each scene. The partial, directed Hausdorff distance is calculated for $O^{auto}$ with respect to $O^{man}$ as, $$\Phi_H(O^{auto}, O^{man}) = \min_{u \in O^{man}} \|v - u\|_2, \forall v \in O^{auto}. \quad (8)$$

B. Cross-Validation Using Support Vector Machine Classifier for Quantitative Evaluation of Architectural Features The SVM classifier [39] is employed to evaluate the ability of the image descriptors to discriminate between high and low levels of LI in HER2+ BC histopathology images. We construct the SVM classifier by using a Gaussian kernel function Π to project training data $Z_{tra} \subset Z$ onto a higher-dimensional space. This high-dimensional representation allows the SVM to construct a hyperplane to separate the two classes (i.e. high and low LI). The classifier is then evaluated by projecting testing data $Z_{tes} \subset Z$ into the same space and recording the locations of the newly embedded samples with respect to the hyperplane.

Given BC histopathology images $C_a, C_b \in Z_{tra}$ with corresponding low-dimensional embedding vectors $F'(C_a)$ and $F'(C_b)$, a,b∈{1, 2, ..., M}, respectively, the Gaussian kernel $\Pi(F'(C_a), F'(C_b)) = \exp(-\in(\|F'(C_a) - F'(C_b)\|_2)^2)$, where ∈ is a scaling factor that normalizes F'($C_a$) and F'($C_b$), is used to project the data into the high-dimensional SVM space [27]. The general form of the SVM is given as, $$\Theta(C_a) = \sum_{y=1}^{\tau} \varepsilon_\gamma y(C_\gamma) \Pi(F'(C_a), F'(C_\gamma)) + b, \quad (9)$$

where $\gamma \in \{1, 2, \ldots, \tau\}$ represents the $\tau$ marginal training samples (i.e. support vectors), b is the hyperplane bias estimated for $Z_{tra}$, and $\xi_\gamma$ is the model parameter determined by maximizing the objective function [38], [39]. The true image label $y(C_b) \in \{+1, -1\}$ represents a high or low level of LI as determined by an expert pathologist. The output of the SVM classifier, $\theta(C_a)$ represents the distance from image scene $C_a$ to the hyperplane. A testing image scene $C_a \in Z_{tes}$ is determined to be classified correctly if $y(C_a) = \text{sign}[\theta(C_a)]$.

The Gaussian kernel has recently become popular for classification in a number of biomedical image processing applications [26], [45]. In an embodiment of the present invention, Gaussian kernel is used instead of the traditional linear kernel [38] because its non-linear projection creates additional separation between the data points in the high-dimensional SVM space and hence, simplifies the classification task.

One problem with the SVM classifier is that it is susceptible to bias from the arbitrary selection of training and testing samples [41]. A k-fold cross-validation system and method [41] is used to mitigate this bias by selecting training samples in a randomized manner and running the SVM classifier multiple times. First Z is divided randomly into k subsets, while ensuring that images from each classy $y \in \{+1,-1\}$, are proportionally represented in each of the k subsets. In an embodiment of the present invention, binary classification is achieved by aggregating the samples labeled as medium LI with the low LI images. Hence the goal of the SVM classifier was to distinguish 22 high and 19 low LI samples. All samples from k−1 subsets are pooled together to obtain $Z_{tra}$ and the remaining subset is used as $Z_{tes}$. For each of the k iterations, an SVM classifier is trained with $Z_{tra}$ and evaluated on $Z_{tes}$; a new $Z_{tes}$ and $Z_{tra}$ being chosen at each iteration so that all samples are evaluated. Using a value of k=3, the entire cross-validation algorithm was repeated over 100 trials and the resulting mean ($\mu_{ACC}$) and standard deviation ($\sigma_{ACC}$) of the classification accuracy obtained. Classification accuracy is defined as the ratio between the number of correctly classified images and the total number of images in the dataset.

C. Formulation of Varma-Zisserman Texton-Based Classifier

The performance of the architectural feature set was compared against the Varma-Zisserman (VZ) texton-based features [46] for distinguishing between the 41 low and high LI images in Z. Textons have previously been shown to be useful in applications related to content-based image retrieval [48] and computer-aided classification [49] for digitized cancer histopathology.

Step 1:
All $C_{tra} \in Z_{tra}$ are first convolved with the Maximum Response 8 (MR8) filter bank [46], which contains edge and bar filters at several orientations and scales. An 8-dimensional MR8 feature vector $f_{text}(c)$ is defined for each $c \in C$, $\forall C_{tra} \in Z_{tra}$.

Step 2:
Feature vectors $f_{text}$ of all $c \in C$, $\forall C_{tra} \in Z_{tra}$ are clustered using the K-means algorithm [41] and the K cluster centers $\{c_1^*, c_2^*, \ldots, c_K^*\}$ are defined as textons.

Step 3:
For each $c \in C_{tra}$, the closest corresponding texton $c_j^*$, $j \in \{1, 2, \ldots, K\}$ is identified based on $\arg\min_j \|f_{text}(c) - f_{text}(c_j^*)\|_2$. A texton histogram is constructed for each $C_{tra} \in Z_{tra}$ as $H(C_{tra}) = (H, h)$ where H is a 1D grid of K bins and h(j) represents the number of $c \in C_{tra}$ identified as being closer to $c_j^*$ than any other texton.

Step 4:
For each novel image scene $C_{tes} \in Z_{tes}$, a corresponding texton histogram $H(C_{tes})$ is computed. The training image scene $C_{tra}^* \in Z_{tra}$ that is most similar to $C_{tes}$ is identified based on $$C_{tra}^* = \underset{C_{tra} \in Z_{tra}}{\arg\min}[\chi^2(\mathcal{H}(C_{tra}), \mathcal{H}(C_{tes}))], \quad (10)$$

where $X^2(H(C_{tra}), H(C_{tes}))$ is the Chi-squared distance [49] between the histograms of $C_{tra}$ and $C_{tes}$. If $y(C_{tes}) = y(C_{tra}^*)$, $C_{tes}$ is said to have been correctly classified; otherwise incorrectly classified. Additional details on the VZ texton approach may be found in reference [46].

The mean $\mu_{ACC}$ and standard deviation $\sigma_{ACC}$ of the classification accuracy of the VZ-texton approach are calculated over 100 randomized 3-fold cross-validation trials (Table III). These experiments were repeated for $K \in \{2,3,5,10\}$.

Results and Discussion

A. Performance of Automated Lymphocyte Detection System and Method

Over a total of $|O^{auto}| = 42{,}000$ automatically detected lymphocyte nuclei for all $C \in Z$, the median partial Hausdorff distance was determined to be 3.70 μm (FIG. 11). Considering an average lymphocyte diameter of approximately 7 μm, these results verify the ability of our detection system and method to accurately detect lymphocytic infiltration in HER2+ BC histopathology imagery.

B. Performance of Graph-Based and Nuclear Features

Table III shows the classification accuracies of the reduced feature set F'(Z) resulting from both automated and manual lymphocyte detection via the SVM classifier. Note that the classification accuracies and variances obtained from the automated detection (90.41%±2, 97%) and manual detection (94.59%±1.72%) system and methods are comparable, reflecting the efficacy of our automated detection system and method. Table III also reveals that the unreduced architectural features F(Z) (via automated lymphocyte detection) achieve a classification accuracy of 89.71%±2.83%, suggesting in turn that GE does not lead to any significant loss in class discriminatory information.

TABLE 3

Results of SVM classification accuracy ($\mu_{ACC}$, $\sigma_{ACC}$) for 41 BC histopathology images using 100 3-fold cross-validation trials for automated and manual lymphocyte detection with the architectural (both reduced F' and unreduced F) and VZ image features.

| Feature Set | Classification Accuracy (%) |
|---|---|
| F' (Z) (automated detection) | 90.41 ± 2.97 |
| F' (Z) (manual detection) | 94.59 ± 1.72 |
| F (Z) (automated detection) | 89.71 ± 2.83 |
| F (Z) (manual detection) | 99.59 ± 0.92 |
| VZ (K = 2) | 48.17 ± 6.08 |
| VZ (K = 3) | 60.20 ± 5.66 |

TABLE 3-continued

Results of SVM classification accuracy ($\mu_{ACC}$, $\sigma_{ACC}$) for 41 BC histopathology images using 100 3-fold cross-validation trials for automated and manual lymphocyte detection with the architectural (both reduced F' and unreduced F) and VZ image features.

| Feature Set | Classification Accuracy (%) |
|---|---|
| VZ (K = 5) | 58.63 ± 7.17 |
| VZ (K = 10) | 56.17 ± 7.63 |

In order to determine the optimal dimensionality for performing classification, the architectural feature set F(Z) was reduced to various dimensionalities {2, 3, . . . , 10} via Graph Embedding. For each dimensionality, the corresponding $\mu_{ACC}$ and error bars ($\sigma_{ACC}$) over 100 trials of randomized 3-fold cross-validation were calculated (FIG. 12). FIG. 12 suggests that classification accuracy is stable at lower dimensionalities and drops off slightly at higher dimensionalities.

C. Performance of Varma-Zisserman Features

The classification results (Table III) show that the Varma-Zisserman (VZ) textural features did not perform as well as the architectural features in distinguishing between BC histopathology samples with high and low levels of LI, with a maximum classification accuracy of 60.20%±5.66%. This result suggests that texture descriptors are unable to quantitatively describe phenotypic changes due to variation in LI extent. Furthermore, both natural variations in histology and imperfections arising from slide preparation (FIG. 4) may have adversely affected the performance of textural features, since the dataset was not screened to exclude such samples. Conversely, architectural features remain unaffected by these issues because they exploit intrinsic properties such as lymphocyte size, shape, intensity, and arrangement to classify the BC histopathology images.

D. Low-Dimensional Manifold Visualization

Apart from helping to deal with the curse of dimensionality problem for classification, another important application of GE is in its ability to help visualize the underlying structure of the data. FIG. 13 shows the reduced dimensional representation (3 dimensions) of the high dimensional architectural and VZ-texture feature spaces. Note that the 3 axes in each of FIGS. 13(a)-(d) reflect the principal Eigen vectors obtained embedding the data via GE. Reducing the architectural feature set to 3 dimensions via Graph Embedding reveals the progression from low to medium to high degrees of LI on a smooth, continuous manifold (FIGS. 13(a), (b)). Conversely, the VZ features (FIGS. 13(c), (d)) neither produce a continuous manifold, nor appear to stratify samples based on LI extent. The plots in FIG. 13 further validate the quantitative classification results shown in Table III and reflect the efficacy of architectural image features in stratifying extent of LI.

An embodiment of the present invention provides a quantitative CADx system for detecting and stratifying the extent of LI in digitized HER2+ BC histopathology images. In one embodiment of the present invention, a system and method is provided to automatically detect and grade the extent of LI using architectural features. In one embodiment of the present invention, non-linearly reducing the high-dimensional architectural image feature space reveals the presence of a smooth, continuous manifold on which BC samples with progressively increasing LI are arranged in a continuum. The region-growing algorithm and subsequent MRF-based refinement of the present invention provides for isolation of LI from the surrounding BC nuclei, stroma, and baseline level of lymphocytes. The architectural (graph-based and nuclear) features, which exploit differences in arrangement of LI, were found to be more successful than textural (VZ) features in distinguishing LI extent. While applying Graph Embedding to the high-dimensional feature space did not adversely affect the classification accuracy of the SVM classifier, in conjunction with the architectural and morphological features it did allow for the visualization of a smooth data manifold. A similar manifold was not reproducible with the VZ features, reflecting that the architectural and morphological features accurately captured class-discriminatory information regarding the spatial extent of LI. The LI classification results were comparable for automated and manual detection, reflecting the robustness of our detection algorithm. The ability of the image analysis algorithm of the present invention to stratify the extent of LI into low, medium, and high grades provides significant translational and prognostic significance, and could be developed into a prognostic test for predicting disease survival and patient outcome. Furthermore, the methods comprising the CADx system and method of the present invention may be employed to characterize LI extent in other tissues and diseases.

The embodiments discussed above are exemplary and are not intended to limit the scope of the present invention. The present invention relates to an image-based computer-aided prognosis (CAP) system and method that seeks to replicate the prognostic power of molecular assays in histopathology and pathological processes, including but not limited to cancer.

REFERENCES

The disclosures of all patent and non-patent literature cited in this application are hereby incorporated by reference in their entireties.

[01] M. B. Flanagan, D. J. Dabbs, et al., "Histopathologic variables predict oncotype dx recurrence score.," *Mod Pathol*, vol. 21, no. 10, pp. 1255-1261, October 2008.

[02] V. R. Korde, H. Bartels, et al., "Automatic segmentation of cell nuclei in bladder and skin tissue for karyometric analysis," in *Biophotonics. Proceedings of the SPIE*, 2007, vol. 6633.

[03] L. Latson et al., "Automated cell nuclear segmentation in color images of hematoxylin and eosin-stained breast biopsy.," *Anal Quant Cytol Histol*, vol. 25, no. 6, pp. 321-331, December 2003.

[04] X. Xie et al., "Mac: Magnetostatic active contour model," *IEEE Trans on PAMI*, vol. 30, no. 4, pp. 632-646, 2008.

[05] A. Ramme, N. Devries, et al., "Semi-automated phalanx bone segmentation using the expectation maximization algorithm.," *J Digit Imaging*, September 2008.

[06] W. H. Wolberg, W. N. Street, et al., "Computer-derived nuclear features distinguish malignant from benign breast cytology.," *Hum Pathol*, vol. 26, no. 7, pp. 792-796, July 1995.

[07] C. Bilgin et al., "Cell-graph mining for breast tissue modeling and classification.," in *IEEE EMBS*, 2007, pp. 5311-5314.

[08] B Hall, W Chen, et al., "A clinically motivated 2-fold framework for quantifying and classifying immunohistochemically stained specimens," in *MICCAI*, 2007, pp. 287-294.

[09] S. Doyle, S. Agner, A. Madabhushi, M. Feldman, and J. Tomaszewski, "Automated grading of breast cancer histopathology using spectral clustering with textural and architectural image features," in *Proc. 5th IEEE International Symposium on Biomedical Imaging: From Nano to Macro*, 2008, pp. 496-499.

[10] C. Cortes and V. Vapnik, "Support-vector networks," *Machine Learning*, vol. 20, no. 3, pp. 273-297, 1995.

[11] Jemal, R. Siegel, E. Ward, Y. Hao, J. Xu, T. Murray, and M. J. Thun, "Cancer statistics, 2008." *CA Cancer J Clin*, vol. 58, no. 2, pp. 71-96, 2008.

[12] F. Bertucci and D. Birnbaum, "Reasons for breast cancer heterogeneity." *J Biol*, vol. 7, no. 2, p. 6, 2008.

[13] J. R. van Nagell, E. S. Donaldson, E. G. Wood, and J. C. Parker, "The significance of vascular invasion and lymphocytic infiltration in invasive cervical cancer." *Cancer*, vol. 41, no. 1, pp. 228-234, January 1978.

[14] S. Aaltomaa, P. Lipponen, M. Eskelinen, V. M. Kosma, S. Mann, E. Alhava, and K. Syrjanen, "Lymphocyte infiltrates as a prognostic variable in female breast cancer." *Eur J Cancer*, vol. 28A, no. 4-5, pp. 859-864, 1992.

[15] G. Alexe, G. S. Dalgin, D. Scanfeld, P. Tamayo, J. P. Mesirov, C. DeLisi, L. Harris, N. Barnard, M. Martel, A. J. Levine, S. Ganesan, and G. Bhanot, "High expression of lymphocyte-associated genes in node-negative her2+ breast cancers correlates with lower recurrence rates." *Cancer Res*, vol. 67, no. 22, pp. 10 669-10 676, November 2007.

[16] W. H. Wolberg, W. N. Street, D. M. Heisey, and O. L. Mangasarian, "Computer-derived nuclear features distinguish malignant from benign breast cytology." *Hum Pathol*, vol. 26, no. 7, pp. 792-796, July 1995.

[17] B. Weyn, G. van de Wouwer, A. van Daele, P. Scheunders, D. van Dyck, E. van Marck, and W. Jacob, "Automated breast tumor diagnosis and grading based on wavelet chromatin texture description." *Cytometry*, vol. 33, no. 1, pp. 32-40, September 1998.

[18] S. Petushi, F. U. Garcia, M. M. Haber, C. Katsinis, and A. Tozeren, "Large-scale computations on histology images reveal grade-differentiating parameters for breast cancer." *BMC Med Imaging*, vol. 6, p. 14, 2006.

[19] B. Karacali and A. Tozeren, "Automated detection of regions of interest for tissue microarray experiments: an image texture analysis." *BMC Med Imaging*, vol. 7, p. 2, 2007.

[20] C. Gunduz, B. Yener, and S. H. Gultekin, "The cell graphs of cancer." *Bioinformatics*, vol. 20 Suppl 1, pp. i145-i151, August 2004.

[21] B. H. Hall, M. Ianosi-Irimie, P. Javidian, W. Chen, S. Ganesan, and D. J. Foran, "Computer-assisted assessment of the human epidermal growth factor receptor 2 immunohistochemical assay in imaged histologic sections using a membrane isolation algorithm and quantitative analysis of positive controls." *BMC Med Imaging*, vol. 8, p. 11, 2008.

[22] S. J. Shin, E. Hyjek, E. Early, and D. M. Knowles, "Intratumoral heterogeneity of her-2/neu in invasive mammary carcinomas using fluorescence in-situ hybridization and tissue microarray." *Int J Surg Pathol*, vol. 14, no. 4, pp. 279-284, October 2006.

[23] F. Schnorrenberg, C. Pattichis, K. Kyriacou, and C. Schizas, "Computeraided detection of breast cancer nuclei," *IEEE Trans. on Information Technology in Biomedicine*, vol. 1, no. 2, pp. 128-140, 1997.

[24] P. Bamford and B. Lovell, "Unsupervised cell nucleus segmentation with active contours," *Signal Processing*, vol. 71, no. 2, pp. 203-213, 1998.

[25] L. Latson, B. Sebek, and K. A. Powell, "Automated cell nuclear segmentation in color images of hematoxylin and eosin-stained breast biopsy." *Anal Quant Cytol Histol*, vol. 25, no. 6, pp. 321-331, December 2003.

[26] S. Naik, S. Doyle, S. Agner, A. Madabhushi, M. Feldman, and J. Tomaszewski, "Automated gland and nuclei segmentation for grading of prostate and breast cancer histopathology," in *Proc. 5th IEEE International Symposium on Biomedical Imaging: From Nano to Macro ISBI 2008*, 2008, pp. 284-287.

[27] W. H. Land, D. W. McKee, T. Zhukov, D. Song, and W. Qian, "A kernelised fuzzy-support vector machine cad system for the diagnosis of lung cancer from tissue images," *International Journal of Functional Informatics and Personalised Medicine*, vol. 1, pp. 26-52(27), 2008.

[28] D. Glotsos, P. Spyridonos, D. Cavouras, P. Ravazoula, P.-A. Dadioti, and G. Nikiforidis, "Automated segmentation of routinely hematoxylin-eosin-stained microscopic images by combining support vector machine clustering and active contour models." *Anal Quant Cytol Histol*, vol. 26, no. 6, pp. 331-340, December 2004.

[29] H. Fatakdawala, A. Basavanhally, J. Xu, G. Bhanot, S. Ganesan, M. Feldman, J. Tomaszewski, and A. Madabhushi, "Expectation maximization driven geodesic active contour: Application to lymphocyte segmentation on digitized breast cancer histopathology," in *IEEE Conference on Bioinformatics and Bioengineering (BIBE)*, 2009.

[30] Basavanhally, S. Agner, G. Alexe, G. Bhanot, S. Ganesan, and A. Madabhushi, "Manifold learning with graph-based features for identifying extent of lymphocytic infiltration from high grade, her2+breast cancer histology," in *Workshop on Microscopic Image Analysis with Applications in Biology (in conjunction with MICCAI)*, 2008. [Online]. Available: http://www.miaab.org/miaab-2008-papers/27-miaab-2008-paper-21.pdf

[31] J. P. Monaco, J. E. Tomaszewski, M. D. Feldman, M. Moradi, P. Mousavi, A. Boag, C. Davidson, P. Abolmaesumi, and A. Madabhushi, "Detection of prostate cancer from whole-mount histology images using markov random fields," in *Workshop on Microscopic Image Analysis with Applications in Biology (in conjunction with MICCAI)*, 2008. [Online]. Available: http://www.miaab.org/miaab-2008-papers/28-miaab-2008-paper-22.pdf

[32] S. Hojjatoleslami and J. Kittler, "Region growing: a new approach," *IEEE Trans. on Image Processing*, vol. 7, no. 7, pp. 1079-1084, 1998.

[33] S. Geman and D. Geman, "Stochastic relaxation, gibbs distributions and the bayesian restoration of images," *IEEE Transactions on Pattern Analysis and Machine Intelligence*, vol. 6, no. 6, pp. 721-741, November 1984.

[34] J. Besag, "Statistical analysis of dirty pictures," *Journal of Royal Statistic Society*, vol. B, no. 68, pp. 259-302, 1986.

[35] S. Doyle, M. Hwang, K. Shah, A. Madabhushi, M. Feldman, and J. Tomaszeski, "Automated grading of prostate cancer using architectural and textural image features," in *Proc. 4th IEEE International Symposium on Biomedical Imaging: From Nano to Macro*, 2007, pp. 1284-1287.

[36] R. E. Bellman, *Adaptive Control Processes: A Guided Tour*. Princeton University Press, 1961.

[37] J. Shi and J. Malik, "Normalized cuts and image segmentation," *IEEE Trans. on Pattern Analysis and Machine Intelligence*, vol. 22, no. 8, pp. 888-905, August 2000.

[38] G. Lee, C. Rodriguez, and A. Madabhushi, "Investigating the efficacy of nonlinear dimensionality reduction system and methods in classifying gene and protein expression studies," *IEEE/ACM Transactions on Computational Biology and Bioinformatics*, vol. 5, no. 3, pp. 368-384, 2008.

[39] C. Cortes and V. Vapnik, "Support-vector networks," *Machine Learning*, vol. 20, no. 3, pp. 273-297, 1995.

[40] M. W. Schwarz, W. B. Cowan, and J. C. Beatty, "An experimental comparison of rgb, yiq, lab, hsv, and opponent color models," *ACM Trans. on Graphics*, vol. 6, no. 2, pp. 123-158, 1987.

[41] R. Duda, P. Hart, and D. Stork, *Pattern Classification*. John Wiley & Sons, 2001.

[42] Papoulis, *Probability, Random Variables, and Stochastic Processes*, None, Ed. McGraw Hill, Inc., 1965.

[43] J. Sudbo, R. Marcelpoil, and A. Reith, "New algorithms based on the voronoi diagram applied in a pilot study on normal mucosa and carcinomas." *Anal Cell Pathol*, vol. 21, no. 2, pp. 71-86, 2000.

[44] D. Huttenlocher, G. Klanderman, and W. Rucklidge, "Comparing images using the hausdorff distance," *IEEE Trans. on Pattern Analysis and Machine Intelligence*, vol. 15, no. 9, pp. 850-863, 1993.

[45] El-Naqa, Y. Yang, M. N. Wernick, N. P. Galatsanos, and R. M. Nishikawa, "A support vector machine approach for detection of microcalcifications." *IEEE Trans Med Imaging*, vol. 21, no. 12, pp. 1552-1563, December 2002. [Online]. Available: http://dx.doi.org/10.1109/TMI.2002.806569

[46] M. Varma and A. Zisserman, "A statistical approach to texture classification from single images," *Int J Comput Vision*, vol. 62, no. 1-2, pp. 61-81, 2005.

[47] F. Schnorrenberg, C. S. Pattichis, C. N. Schizas, and K. Kyriacou, "Content-based retrieval of breast cancer biopsy slides." *Technol Health Care*, vol. 8, no. 5, pp. 291-297, 2000.

[48] O. Tuzel, L. Yang, P. Meer, and D. J. Foran, "Classification of hematologic malignancies using texton signatures," *Pattern Analysis & Applications*, vol. 10, no. 4, pp. 277-290, 2007.

[49] J. Naik, S. Doyle, A. Basavanhally, S. Ganesan, M. Feldman, J. Tomaszewski, and A. Madabhushi, "A boosted distance metric: Application to content based image retrieval and classification of digitized histopathology," in *SPIE Medical Imaging*, vol. 7260, 2009. [Online]. Available: http://dx.doi.org/10.1117/12.813931

What is claimed is:

1. An image-based risk score predictor method for measuring cancer extent to evaluate disease outcome in cancer patients using digitized histopathology comprising:
   i. scanning stained histopathology slides into a computer using a high resolution whole slide scanner;
   ii. detecting cancer nuclei using an Expectation-Maximization based algorithm;
   iii. constructing the Delaunay Triangulation and Minimum Spanning Tree graphs using the centers of individual detected cancer nuclei as vertices;
   iv. extracting image-derived features describing the arrangement of the cancer nuclei from each image;
   v. projecting high-dimensional image derived feature vector into a reduced 3D embedding space via Graph Embedding;
   vi. unwrapping the 3D embedding into a 1D scale to define image-based risk scores for poor, intermediate, and good outcome;
   vii. determining an image-based recurrence score to distinguish between low, intermediate, and high cancer grades by uncovering the grade labels of the samples on the 1D line and their relative locations to predict prognosis.

2. An image-based risk score predictor method for measuring extent of pathological process to evaluate disease outcome in patients using digitized histopathology comprising:
   scanning stained histopathology slides into a computer using a high resolution whole slide scanner;
   detecting pathological nuclei using an Expectation-Maximization based algorithm;
   constructing the Delaunay Triangulation and Minimum Spanning Tree graphs using the centers of individual detected pathological nuclei as vertices;
   extracting image-derived features describing the arrangement of the pathological nuclei from each image;
   projecting high-dimensional image derived feature vector into a reduced 3D embedding space via Graph Embedding;
   unwrapping the 3D embedding into a 1D scale to define image-based risk scores for poor, intermediate, and good outcome;
   determining an image-based recurrence score to distinguish between low, intermediate, and high pathological disease grades by uncovering the grade labels of the samples on the 1D line and their relative locations to predict prognosis.

3. An image-based risk score predictor method for measuring cancer extent to evaluate disease outcome in node-negative, estrogen receptor-positive breast cancer patients using digitized histopathology comprising:
   i. scanning stained histopathology slides into a computer using a high resolution whole slide scanner;
   ii. detecting cancer nuclei using an Expectation-Maximization based algorithm;
   iii. constructing the Delaunay Triangulation and Minimum Spanning Tree graphs using the centers of individual detected cancer nuclei as vertices;
   iv. extracting image-derived features describing the arrangement of the cancer nuclei from each image;
   v. projecting high-dimensional image derived feature vector into a reduced 3D embedding space via Graph Embedding;
   vi. unwrapping the 3D embedding into a 1D scale to define image-based risk scores for poor, intermediate, and good outcome;
   vii. determining an image-based recurrence score to distinguish between low, intermediate, and high cancer grades by uncovering the grade labels of the samples on the 1D line and their relative locations to predict prognosis.

4. A method for measuring extent of lymphocytic infiltration to evaluate disease outcome in breast cancer patients expressing the human epidermal growth factor receptor 2 (HER2) comprising:
   i. scanning stained histopathology slides into a computer using a high resolution whole slide scanner;
   ii. detecting lymphocyte nuclei using a combination of region-growing and Markov Random Field algorithms;
   iii. constructing a Voronoi Diagram, Delaunay Triangulation, and Minimum Spanning Tree using the centers of individual detected lymphocyte nuclei as vertices;
   iv. extracting image-derived features describing the arrangement of the lymphocyte nuclei from each image;
   v. projecting high-dimensional image derived feature vector into a reduced 3D embedding space via Graph Embedding.

5. The image-based risk score predictor method of claim 2, wherein the determination of an image-based recurrence score distinguishes between a low, an intermediate, and a high cancer grade by uncovering the grade labels of the samples on the 1D line and their relative locations to predict prognosis.

* * * * *